US011740126B2

(12) United States Patent
Ridder et al.

(10) Patent No.: US 11,740,126 B2
(45) Date of Patent: Aug. 29, 2023

(54) MULTIPLEXING AND ENCODING FOR REFERENCE SWITCHING

(71) Applicant: Apple Inc., Cupertino, CA (US)

(72) Inventors: Trent D. Ridder, Sunnyvale, CA (US); Mark Alan Arbore, Los Altos, CA (US); Gary Shambat, San Francisco, CA (US); Robert Chen, San Francisco, CA (US); David I. Simon, San Francisco, CA (US); Miikka M. Kangas, Campbell, CA (US)

(*) Notice: Subject to any disclaimer, the term of this patent is extended or adjusted under 35 U.S.C. 154(b) by 22 days.

(21) Appl. No.: 17/351,067

(22) Filed: Jun. 17, 2021

(65) Prior Publication Data

US 2021/0310867 A1    Oct. 7, 2021

Related U.S. Application Data

(63) Continuation of application No. 16/095,323, filed as application No. PCT/US2017/027377 on Apr. 13, 2017, now Pat. No. 11,041,758.
(Continued)

(51) Int. Cl.
*G01J 3/427* (2006.01)
*G01J 3/10* (2006.01)
(Continued)

(52) U.S. Cl.
CPC ............... *G01J 3/427* (2013.01); *G01J 3/06* (2013.01); *G01J 3/10* (2013.01); *G01J 3/108* (2013.01);
(Continued)

(58) Field of Classification Search
CPC .... G01J 3/427; G01J 3/42; G01J 3/108; G01J 3/2846; G01J 3/10; G01J 3/2803; G01J 3/06; G01N 21/35; G01N 21/25
See application file for complete search history.

(56) References Cited

U.S. PATENT DOCUMENTS 3,805,074 A    4/1974  McCormack
3,818,223 A    6/1974  Gibson et al.
(Continued)

FOREIGN PATENT DOCUMENTS

CN    1320311     6/2007
CN    101783306   7/2010
(Continued)

OTHER PUBLICATIONS

Lee, S.K. et al. (Apr. 1985). "A Multi-Touch Three Dimensional Touch-Sensitive Tablet," Proceedings of CHI: ACM Conference on Human Factors in Computing Systems, pp. 21-25.
(Continued)

*Primary Examiner* — Dominic J Bologna
(74) *Attorney, Agent, or Firm* — Brownstein Hyatt Farber Schreck, LLP

(57) ABSTRACT

Methods and systems for measuring one or more properties of a sample are disclosed. The methods and systems can include multiplexing measurements of signals associated with a plurality of wavelengths without adding any signal independent noise and without increasing the total measurement time. One or more levels of encoding, where, in some examples, a level of encoding can be nested within one or more other levels of encoding. Multiplexing can include wavelength, position, and detector state multiplexing. In some examples, SNR can be enhanced by grouping together one or more signals based on one or more properties including, but not limited to, signal intensity, drift properties, optical power detected, wavelength, location within one or more components, material properties of the light sources, and electrical power. In some examples, the system can be configured for optimizing the conditions of each group individually based on the properties of a given group.

19 Claims, 14 Drawing Sheets

Related U.S. Application Data

(60) Provisional application No. 62/325,927, filed on Apr. 21, 2016.

(51) Int. Cl.

| | | |
|---|---|---|
| *G01J 3/28* | (2006.01) | |
| *G01J 3/42* | (2006.01) | |
| *G01J 3/06* | (2006.01) | |
| *G01N 21/25* | (2006.01) | |
| *G01N 21/35* | (2014.01) | |

(52) U.S. Cl.
CPC .......... *G01J 3/2803* (2013.01); *G01J 3/2846* (2013.01); *G01J 3/42* (2013.01); *G01N 21/25* (2013.01); *G01N 21/35* (2013.01)

(56) References Cited

U.S. PATENT DOCUMENTS

| | | | |
|---|---|---|---|
| 4,262,205 A | | 4/1981 | Abu-Shymays |
| 4,422,766 A | | 12/1983 | Skukalek |
| 5,483,261 A | | 1/1996 | Yasutake |
| 5,488,204 A | | 1/1996 | Mead et al. |
| 5,579,105 A | * | 11/1996 | Belton ................. G01J 3/2846 356/310 |
| 5,825,352 A | | 10/1998 | Bisset et al. |
| 5,835,079 A | | 11/1998 | Shieh |
| 5,880,411 A | | 3/1999 | Gillespie et al. |
| 6,139,800 A | * | 10/2000 | Chandler ........... G01N 15/1456 422/82.08 |
| 6,188,391 B1 | | 2/2001 | Seely et al. |
| 6,310,610 B1 | | 10/2001 | Beaton et al. |
| 6,323,846 B1 | | 11/2001 | Westerman et al. |
| 6,690,387 B2 | | 2/2004 | Zimmerman et al. |
| 6,894,264 B2 | | 5/2005 | Sagatelyan et al. |
| 7,015,894 B2 | | 3/2006 | Morohoshi |
| 7,184,064 B2 | | 2/2007 | Zimmerman et al. |
| 7,283,243 B2 | | 10/2007 | Langford et al. |
| 7,663,607 B2 | | 2/2010 | Hotelling et al. |
| 8,479,122 B2 | | 7/2013 | Hotelling et al. |
| 10,605,660 B2 | * | 3/2020 | Raz ......................... G01J 3/502 |
| 11,041,758 B2 | | 6/2021 | Ridder et al. |
| 11,275,405 B2 | | 3/2022 | Hotelling |
| 2006/0197753 A1 | | 9/2006 | Hotelling |
| 2015/0116721 A1 | * | 4/2015 | Kats ...................... G01J 3/0205 359/887 |
| 2016/0065915 A1 | * | 3/2016 | Potter ...................... H04N 9/09 348/273 |
| 2017/0152551 A1 | * | 6/2017 | Hildebrandt ....... G01N 21/6428 |
| 2018/0209850 A1 | * | 7/2018 | Raz ........................ G01J 3/2823 |
| 2019/0128734 A1 | * | 5/2019 | Arbore .................. G01J 3/0256 |

FOREIGN PATENT DOCUMENTS

| | | |
|---|---|---|
| CN | 102084240 | 6/2011 |
| CN | 102326069 | 1/2012 |
| CN | 103163639 | 6/2013 |
| CN | 104122221 | 10/2014 |
| JP | 2000163031 | 6/2000 |
| JP | 2002342033 | 11/2002 |
| KR | 20050003353 | 1/2005 |
| KR | 20060086843 | 8/2006 |
| WO | WO 03/087787 | 10/2003 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

ID STATES PATENT

MULTIPLEXING AND ENCODING FOR REFERENCE SWITCHING

CROSS REFERENCE TO RELATED APPLICATIONS

This application is a continuation of U.S. patent application Ser. No. 16/095,323, filed Oct. 19, 2018, which is a National Phase Patent Application under 35 U.S.C. § 371 of International Application No. PCT/US2017/027377, filed Apr. 13, 2017, and claims benefit of U.S. Provisional Patent Application No. 62/325,927, filed Apr. 21, 2016, the entire disclosures of which are incorporated herein by reference for all purposes.

FIELD

This relates generally to multiplexing and encoding schemes for measuring one or more properties of a sample.

BACKGROUND

Absorption spectroscopy is an analytical technique that can be used to determine one or more properties of a sample. Conventional systems and methods for absorption spectroscopy can include emitting light into the sample. As light is transmitted through the sample, a portion of the light energy can be absorbed at one or more wavelengths. This absorption can cause a change in the properties of the light exiting the sample. The properties of the light exiting the sample can be compared to the properties of the light exiting a reference, and the one or more properties of the sample can be determined based on this comparison.

In some examples, optical measurements can include noise, which can differ depending on wavelength or the state of one or more components in the system. Signal intensity due to the one or more properties of the sample can also differ depending on location in the sample. Thus, the signal-to-noise ratio can vary depending on wavelength, location in the sample, and state of the components. To enhance signal-to-noise ratio (SNR), multiple scans can measure the signals multiple times, and averaging or filtering techniques can be used to reduce noise. However, this method can lead to long measurement times and may not be accurate if the device or sample being measured is not stable (i.e., drifts) over time. Thus, methods and systems capable of enhancing SNR and minimizing the influence of drift and other time varying properties (e.g., heat and load dissipation or power consumption) of the components without adding any signal independent noise and without increasing the total measurement times may be desired.

SUMMARY

This disclosure relates to methods and systems for measuring one or more properties of a sample. The methods and systems can include multiplexing measurements that can measure signals associated with a plurality of wavelengths without adding any signal independent noise and without increasing the total measurement time. The methods and systems can include one or more levels of encoding, where, in some examples, a level of encoding can be nested within one or more other levels of encoding. Multiplexing can include wavelength multiplexing, position multiplexing, and detector state multiplexing. In some examples, enhanced SNR can be achieved by grouping together one or more signals. Grouping can be based on one or more properties including, but not limited to, signal intensity, drift properties, optical power detected, wavelength, location within one or more components, material properties of the light sources, and electrical power. In some examples, the system can be configured for optimizing the conditions of each group individually based on the properties of a given group.

DETAILED DESCRIPTION

Figure 1A:
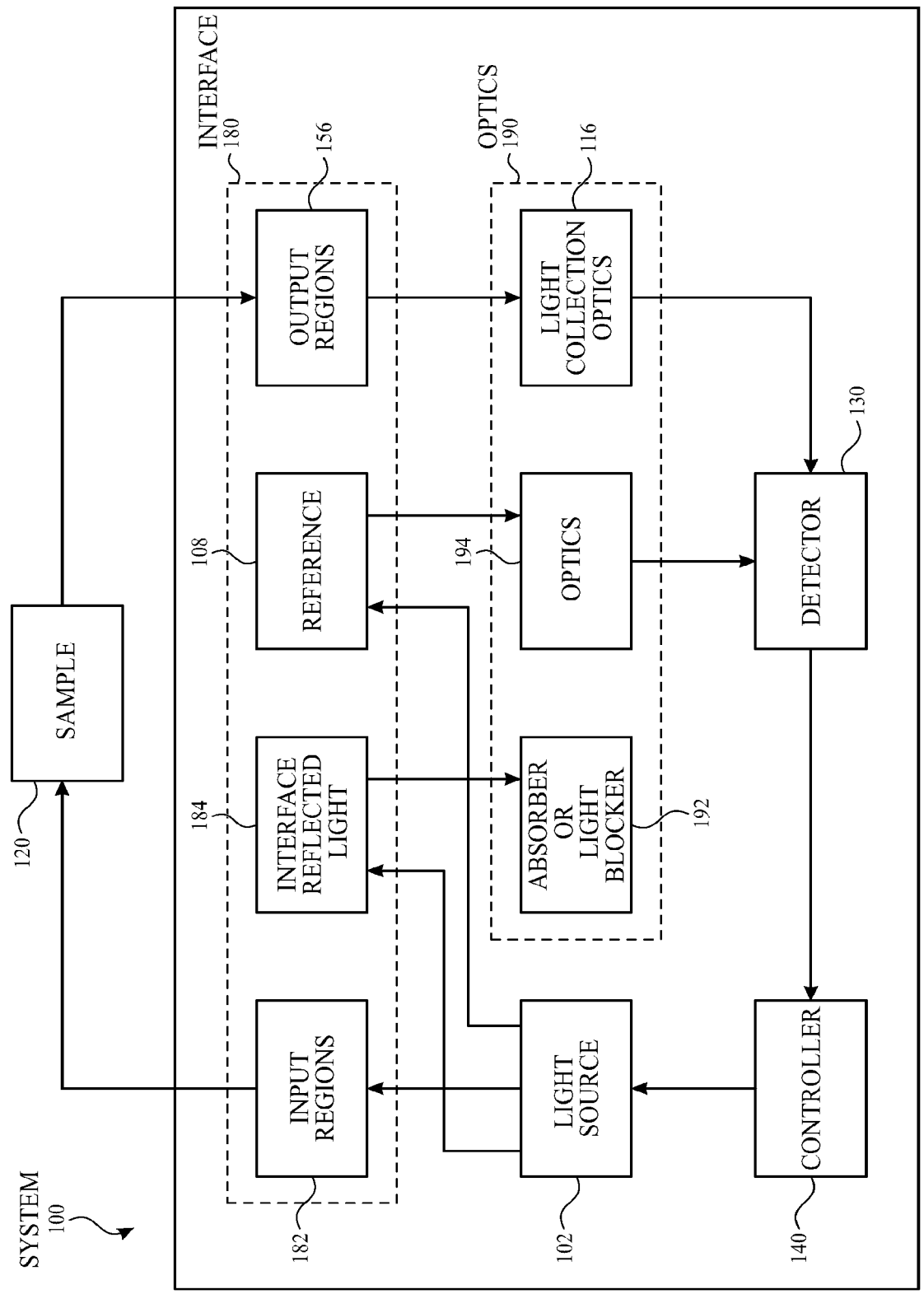
FIG. 1A illustrates a block diagram of an exemplary system capable of measuring one or more properties located at multiple locations within a sample according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Absorption spectroscopy is an analytical technique that can be used to determine one or more properties of a sample. Light can have an initial intensity or energy when emitted from a light source and incident on the sample. As light is transmitted through the sample, a portion of the energy can be absorbed at one or more wavelengths. This absorption can cause a change (or loss) in the intensity of light exiting the sample. Light exiting the sample can be due to light that scatters from one or more locations within the sample, wherein the location can include a substance of interest. In some examples, the substance of interest can be present in some or all of the path of light into and/or out of the sample, where the measured absorbance can include absorption at one or more regions where the light scatters. The amount of light exiting the sample can decrease exponentially as the concentration of the substance of interest in the sample increases. In some examples, the substance can include one or more chemical constituents, and the measurement can be used to determine the concentration of each chemical constituent present in the sample.

Figure 1B:
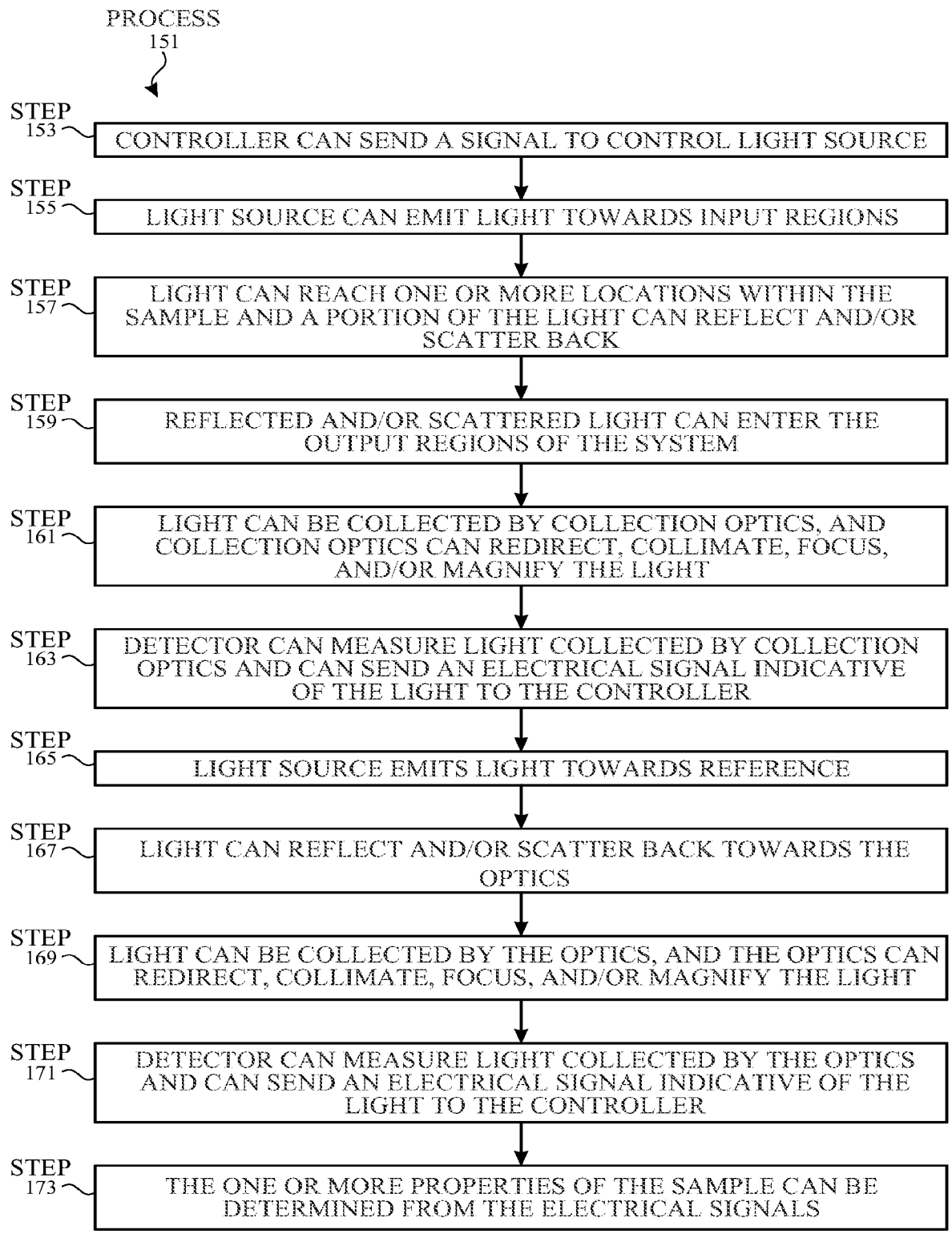
FIG. 1B illustrates an exemplary process flow for measuring one or more properties located at multiple locations within a sample according to examples of the disclosure.

FIG. 1A illustrates a block diagram of an exemplary system and FIG. 1B illustrates an exemplary process flow for measuring one or more substances located at multiple locations within the sample according to examples of the disclosure. System 100 can include interface 180, optics 190, light source 102, detector 130, and controller 140. Interface 180 can include input regions 182, interface reflected light 184, reference 108, and output regions 156. In some examples, input regions 182 and/or output regions 156 can include an aperture layer including one or more openings configured to limit the location and/or angles of light exiting and/or entering the system. By limiting the location and/or angles of light exiting and/or entering the system, the light incident on, or exiting from sample 120 can also be limited. Optics 190 can include an absorber or light blocker 192, optics 194 (e.g., a negative micro-lens), and light collection optics 116 (e.g., a positive microlens). Sample 120 can be located near, close to, or touching at least a portion of system 100. Light source 102 can be coupled to controller 140. Controller 140 can send a signal (e.g., current or voltage waveform) to control light source 102 to emit light towards the surface of sample 120 (step 153 of process 151). Depending on whether the system is measuring the one or more properties of the sample or of the reference, light source 102 can emit light towards input regions 182 (step 155 of process 151) or reference 108.

Input regions 182 can be configured to allow light to exit system 100 to be incident on sample 120. Light can penetrate a certain depth into sample 120 and can reflect and/or scatter back towards system 100 (step 157 of process 151). The reflected and/or scattered light can enter back into system 100 at output regions 156 (step 159 of process 151). The reflected and/or scattered light that enters back into system 100 can be collected by light collection optics 116, which can redirect, collimate, focus, and/or magnify the reflected and/or scattered light (step 161 of process 151). The reflected and/or scattered light can be directed towards detector 130. Detector 130 can detect the reflected and/or scattered light and can send an electrical signal indicative of the light to controller 140 (step 163 of process 151).

Light source 102 can, additionally or alternatively, emit light towards reference 108 (step 165 of process 151). Reference 108 can reflect light towards optics 194 (step 167 of process 151). Reference 108 can include, but is not limited to, a mirror, a filter, and/or a sample with known optical properties. Optics 194 can redirect, collimate, focus, and/or magnify light towards detector 130 (step 169 of process 151). Detector 130 can measure light reflected from reference 108 and can generate an electrical signal indicative of this reflected light (step 171 of process 151). Controller 140 can be configured to receive both the electrical signal indicative of light reflected/scattered from sample 120 and the electrical signal indicative of light reflected from reference 108 from detector 130. Controller 140 (or another processor) can determine one or more properties of the sample from the electrical signals (step 173 of process 151).

In some examples, when the system is measuring the one or more substances in the sample and in the reference, light emitted from the light source 102 can reflect off a surface of the sample back into system 100. Light reflected off the exterior interface of the system (e.g., interface where the system contacts the sample) can be referred to as interface reflected light 184. In some examples, interface reflected light 184 can be light emitted from light source 102 that has not reflected off sample 120 or reference 108 and can be due to light scattering. Since interface reflected light 184 can be unwanted, absorber or light blocker 192 can prevent interface reflected light 184 from being collected by optics 194 and light collection optics 116, which can prevent interface reflected light 184 from being measured by detector 130.

Figure 2:
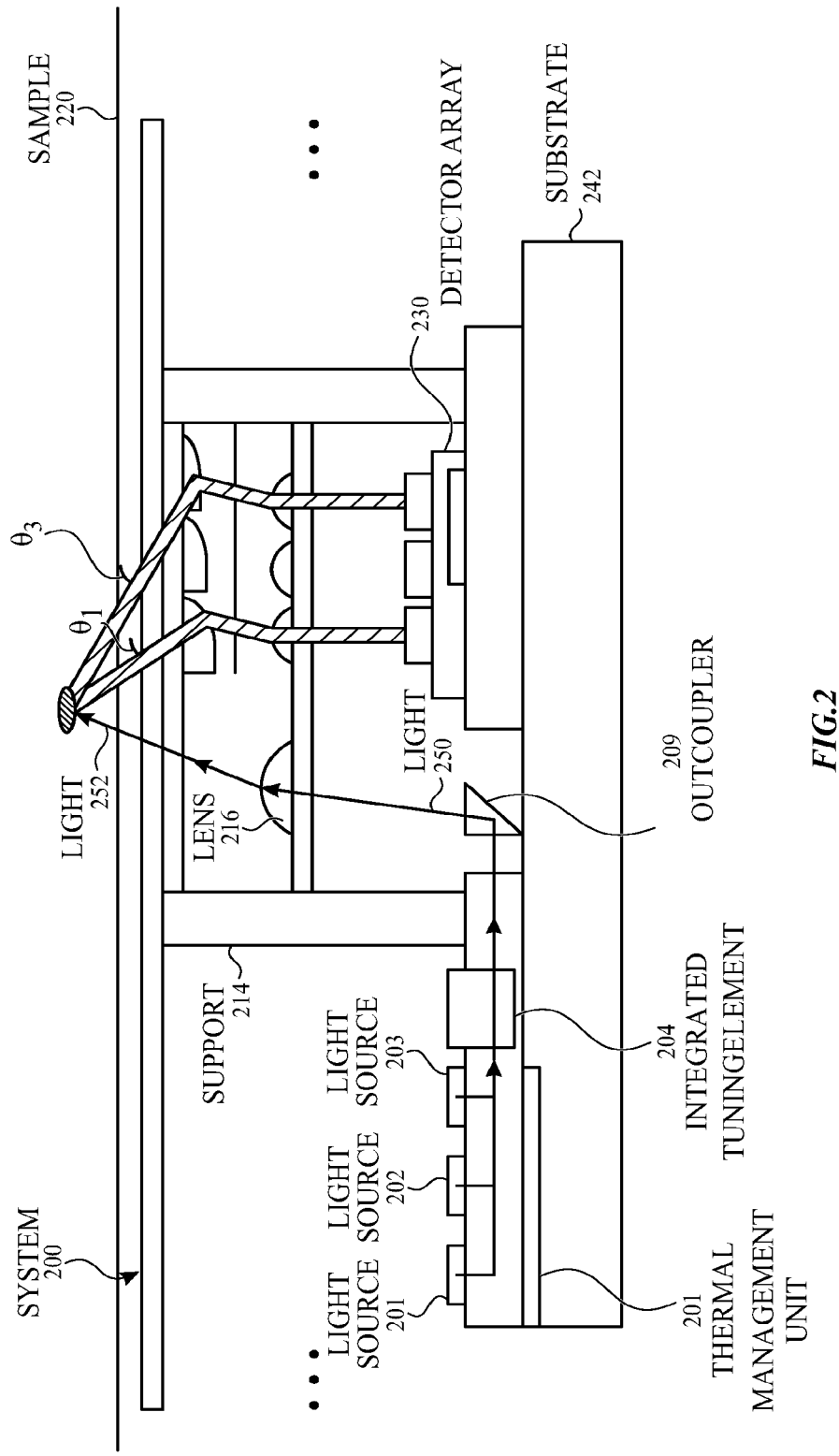
FIG. 2 illustrates a cross-sectional view of a portion of an exemplary unit included in a system configured for resolving multiple angles of incidence on a sample surface with two-layers of optics according to examples of the disclosure.

FIG. 2 illustrates a cross-sectional view of a portion of an exemplary unit included in a system configured for resolving multiple angles of incidence on a sample surface with two-layers of optics according to examples of the disclosure. System 200 can be close to, touching, resting on, or attached to sample 220. Sample 220 can include one or more measurement regions. In some examples, the measurement region(s) can be associated with one or more scattering events. System 200 can be configured to reconstruct the optical paths in sample 220. For example, system 200 can be configured to reconstruct the angles of incident light and the exit locations to another plane (e.g., a plane located closer to detector array 230). Reconstruction of the optical paths can be performed using one or more layers of optics. System 200 can include two layers of optics, for example. Located below (i.e., opposite the surface of sample 220) the layers of optics can be a detector array 230, and the two-layers of optics can be supported by support 214. Located between the two layers of optics can be air, a vacuum, or any medium with a refractive index that contrasts the refractive index of the optics. Although the figures illustrate a system including two-layers of optics, examples of the disclosure can include, but are not limited to, any number of layers of optics include one layer or more than two layers.

System 200 can include light sources, such as light source 201, light source 202, and light source 203. The light sources can be configured to emit light 250. The light sources can be any source capable of generating light including, but not limited to, a lamp, laser, LED, OLED, EL source, QD light emitter, super-luminescent diode, super-continuum source, fiber-based source, or a combination of one or more of these sources. In some examples, the light sources can be capable of emitting a single wavelength of light. In some examples, the light sources can be capable of emitting a plurality of wavelengths of light. In some examples, the light sources can be any tunable source capable of generating a SWIR signature. In some examples, each of the light sources can emit a different wavelength range of light (e.g., different colors in the spectrum). In some examples, the light sources can include a III-V material, such as Indium Phosphide (InP), Gallium Antimonide (GaSb), Gallium Arsenide Antimonide (GaAsSb), Aluminum Arsenide (AlAs), Aluminum Gallium Arsenide (AlGaAs), Aluminum Indium Arsenide (AlInAs), Indium Gallium Phosphide (InGaP), Indium Gallium Arsenide (InGaAs), Indium Arsenide Antimonide (InAsSb), Indium Phosphide Antimonide (InPSb), Indium Arsenide Phosphide Antimonide (InAsPSb), and Gallium Indium Arsenide Antimonide Phosphide (GaInAsSbP).

Light from the light sources can be combined using integrated tuning elements 204, optical traces (not shown), and/or one or more multiplexers (not shown). In some examples, integrated tuning elements 204, optical traces, and multiplexer(s) can be disposed on a substrate 242 or included in a single optical platform, such as a silicon photonics chip. System 200 can also include a thermal management unit for controlling, heating, or cooling the temperature of the light sources. Coupled to the multiplexer(s) can be outcouplers 209. Outcouplers 209 can optionally be configured to focus, collect, collimate, and/or condition (e.g., shape) the light beam from the multiplexer(s) towards lens 216. In some examples, outcouplers 209 can be configured as a single mode waveguide that directs a well-defined (i.e., directional and sharp) light beam towards lens 216. In some examples, light 250 from outcouplers 209 can be a light beam with a conical or cylindrical shape. Lens 216 can receive light 250 and can collimate and tilt the light beam towards one or more locations in sample 220. In some examples, lens 216 can include a bottom surface (i.e., surface facing outcouplers 209) that is flat (or within 10% from flat) and a top surface (i.e., surface facing away from outcouplers 209) that is convex. Light emitted from the light sources that can be collimated by outcouplers 209, transmitted through lens 216, and exits system 200 can be referred to as light 252.

In some examples, each light source (e.g., light source 201, light source 202, or light source 203) included in system 200 can emit light at a different wavelength from other light sources. Each light source can be independently controlled (e.g., turned on and off). With independent control, a controller (not shown) coupled to the light sources can have knowledge of which wavelengths of light are being measured. As a result, a dedicated component, such as an interferometer to spatially separate or modulate the wavelength may no longer be needed. To measure the absorption spectrum of a substance of interest in the sample, the system can be configured to measure the absorption across multiple wavelengths of interest.

Figure 3:
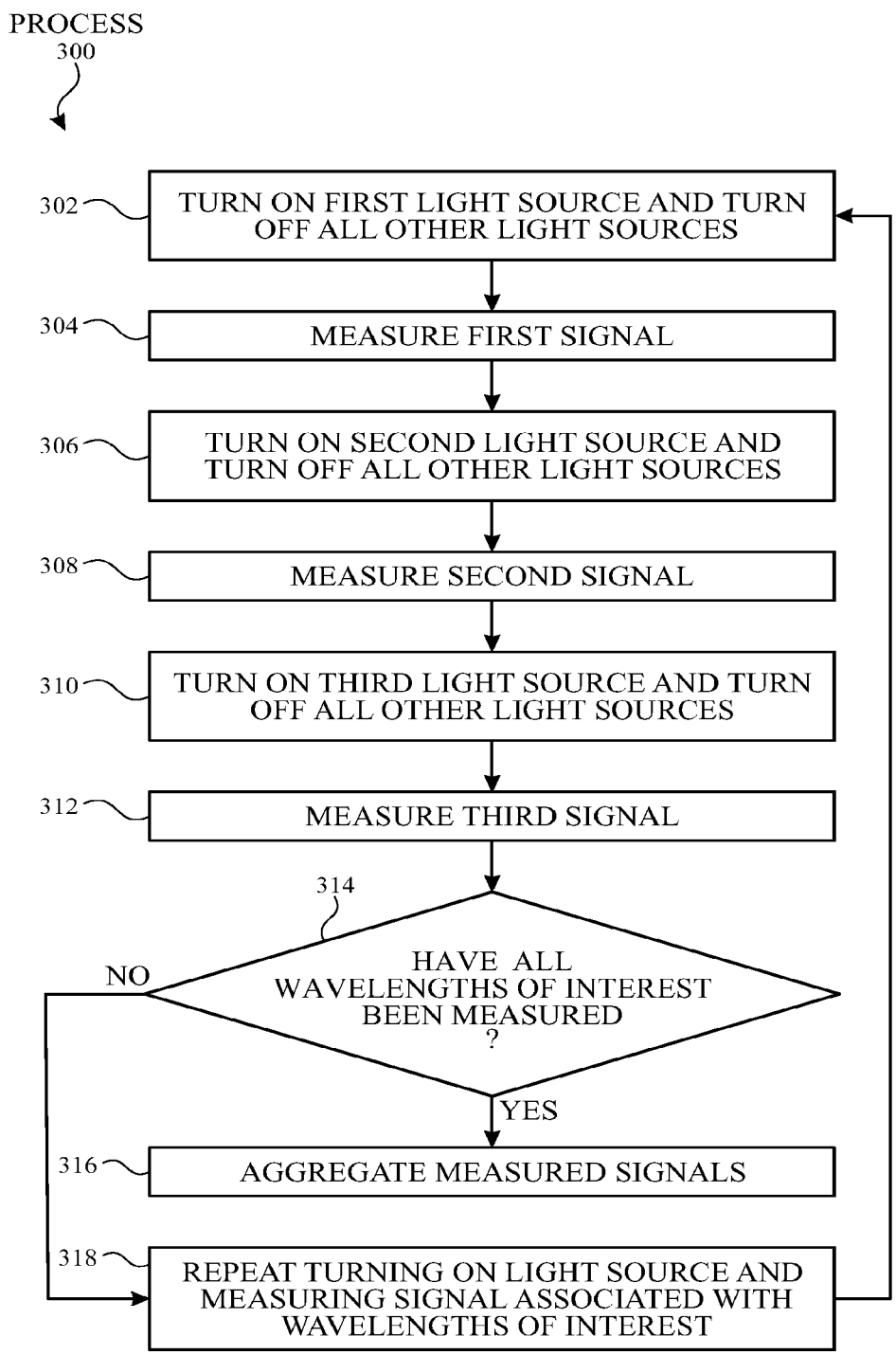
FIG. 3 illustrates an exemplary process flow for sequentially measuring multiple wavelengths of interest according to examples of the disclosure.

To measure the multiple wavelengths of interest, each wavelength can be measured one at a time (i.e., sequentially). FIG. 3 illustrates an exemplary process flow for sequentially measuring multiple wavelengths of interest according to examples of the disclosure. Referring to FIG. 2, light source 201 can be configured to emit at wavelength $\lambda_A$, light source 202 can be configured to emit at wavelength $\lambda_B$, and light source 203 can be configured to emit at wavelength $\lambda_C$. In some examples, each wavelength can be measured independently (i.e., at different times). A first light source (e.g., light source 201) can be turned on, while all other light sources (e.g., light source 202 and light source 203) can be turned off (step 302 of process 300), and a first signal (i.e., signal $I_1$ at wavelength $\lambda_A$) can be measured (step 304 of process 300). A second light source (e.g., light source 202) can be turned on, while all other light sources (e.g., light source 201 and light source 203) can be turned off (step 306 of process 300), and a second signal (i.e., signal $I_2$ at wavelength $\lambda_B$) can be measured (step 308 of process 300). A third light source (i.e., light source 203) can be turned on, while all other light sources (e.g., light source 201 and light source 202) can be turned off (step 310 of process 300), and a third signal (i.e., signal $I_3$ at wavelength $\lambda_C$) can be measured (step 312 of process 300). The process can be repeated until all wavelengths of interest have been measured (step 314 of process 300 and step 318 of process 300). The controller can aggregate the measured signals (e.g., signal $I_1$, signal $I_2$, signal $I_3$) (step 316 of process 300) to form the measurement spectrum (i.e., spectrum of signal intensity versus wavelength).

Each measured signal can include an error component associated with noise present. In some examples, noise can be independent of the signal (i.e., noise independent signal) and can be averaged. For example, for three wavelengths, the measured signals for can be written as:

$$I_1 = 1 \times I_A + 0 \times I_B + 0 \times I_C + e_1 \tag{1}$$

$$I_2 = 0 \times I_A + 1 \times I_B + 0 \times I_C + e_2 \tag{2}$$

$$I_3 = 0 \times I_A + 0 \times I_B + 1 \times I_C + e_3 \tag{3}$$

where "1" indicates that the light source of the corresponding wavelength is on, "0" indicates that the light source of the corresponding wavelength is off or blocked, $I_A$ is the noiseless signal at wavelength $\lambda_A$, $I_B$ is the noiseless signal at wavelength $\lambda_B$, $I_C$ is the noiseless signal at wavelength $\lambda_C$, $e_1$ is the error associated with measured signal $I_1$, $e_2$ is the error associated with measured signal $I_2$, and $e_3$ is the error associated with measured signal $I_3$.

Equations 1-3 can reduce to:

$$I_1 = I_A + e_1 \tag{4}$$

$$I_2 = I_B + e_2 \tag{5}$$

$$I_3 = I_C + e_3 \tag{6}$$

Since error $e_1$, error $e_2$, and error $e_3$ can be unknown and may not be capable of being ascertained, the signals (e.g., signal $I_A$, signal $I_B$, and signal $I_C$) at each wavelength may be compromised. Although the sequential measurement scheme (i.e., sequentially measuring each wavelength) can be straightforward to implement, the SNR and measurement accuracy can be compromised. While the SNR can be increased by increasing the measurement time of each wavelength or repeating the measurement at each wavelength and using the average value, this method can lead to long, unwanted total measurement times and may not be accurate if the device or sample being measured is not stable (i.e., drifts) over time.

In some examples, a multiplexing measurement scheme can be utilized to measure multiple wavelengths while reducing errors from noise. For example, the multiplexing measurement scheme can be utilized to measure all wavelengths of interest at a given time. In spectroscopic measurements, the measured signals can include photon independent noise that can be averaged. The magnitude of noise included in the final measured spectra can be reduced, and the reduction relative to the sequential measurement can be based on the number of wavelengths multiplexed. Multiplexing measurement schemes can be utilized in Fourier Transform spectrometers and dispersive spectrometers, for example.

In some examples, the multiplexing measurement scheme can include the same or fewer numbers of measurements than the sequential measurement scheme. In the multiplexing measurement scheme, the measured signals for the three wavelength example can be written as:

$$I_1 = 1 \times I_A + 0 \times I_B + 1 \times I_C + e_1 \quad (7)$$

$$I_2 = 0 \times I_A + 1 \times I_B + 1 \times I_C + e_2 \quad (8)$$

$$I_3 = 1 \times I_A + 1 \times I_B + 0 \times I_C + e_3 \quad (9)$$

That is, the device can be used to measure three intensities $I_1$, $I_2$, and $I_3$, where each equation can be referred to as a state. For each state, the 0s and 1s can indicate which wavelengths of light are off and on (i.e., light emitted) for the state, respectively. Using linear algebra, the noiseless wavelength-dependent signals (i.e., signal $I_A$, signal $I_B$, and signal $I_C$) can be determined. In comparison to the sequential measurement scheme, the multiplexing measurement scheme can measure a plurality of wavelengths at the same time. For example, two wavelengths $\lambda_A$ and $\lambda_C$ can be measured at the same time and can be included in the measurement signal $I_1$. Thus, at a given time the multiplexing measurement scheme can detect more signals than the sequential measurement scheme without any added signal independent noise and without increasing the total measurement time.

Equations 7-9 can be rewritten in matrix form as:

$$\begin{bmatrix} I_1 \\ I_2 \\ I_3 \end{bmatrix} = E \begin{bmatrix} I_A \\ I_B \\ I_C \end{bmatrix} + \begin{bmatrix} e_1 \\ e_2 \\ e_3 \end{bmatrix} \quad (10)$$

where E can represent the encoding matrix. The encoding matrix can include rows that define a series of measurement states to indicate which wavelengths are being measured (i.e., which light sources are on and off as indicated by the 0s and 1s in Equations 7-9) during that measurement state. Although the disclosure discusses the information for the measurement states as an "encoding matrix," examples of the disclosure are not limited to matrices and can include information stored and/or arranged in any form. The encoding matrix can be any matrix such that linear algebra can be used to recover the noiseless wavelength-dependent signals.

In some examples, the encoding matrix can be a square matrix that has an inverse. In some examples, the encoding matrix can be a predefined matrix based on the application. Equation 10 can be rewritten as:

$$\begin{bmatrix} I_1 \\ I_2 \\ I_3 \end{bmatrix} = \begin{bmatrix} 1 & 0 & 1 \\ 0 & 1 & 1 \\ 1 & 1 & 0 \end{bmatrix} \begin{bmatrix} I_A \\ I_B \\ I_C \end{bmatrix} + \begin{bmatrix} e_1 \\ e_2 \\ e_3 \end{bmatrix} \quad (11)$$

The measurement times of each measurement state can be the same or can be different from the other measurement states. In some examples, a measurement state can be measured multiple times to generate a plurality of signals. In some examples, the intensities of the plurality of signals can be averaged. In some examples, some of the plurality of signals can be ignored and some of the plurality of signals can be processed.

To determine the wavelength-dependent signals (e.g., signal $I_A$, signal $I_B$, and signal $I_C$), both sides of Equation 11 can be multiplied by the inverse of the encoding matrix. The inverse of the encoding matrix given in Equation 11 can be written as:

$$E^{-1} = \begin{bmatrix} 0.5 & -0.5 & 0.5 \\ -0.5 & 0.5 & 0.5 \\ 0.5 & 0.5 & -0.5 \end{bmatrix} \quad (12)$$

such that:

$$\begin{bmatrix} 1 & 0 & 1 \\ 0 & 1 & 1 \\ 1 & 1 & 0 \end{bmatrix} \begin{bmatrix} 0.5 & -0.5 & 0.5 \\ -0.5 & 0.5 & 0.5 \\ 0.5 & 0.5 & -0.5 \end{bmatrix} = \begin{bmatrix} 1 & 0 & 0 \\ 0 & 1 & 0 \\ 0 & 0 & 1 \end{bmatrix} \quad (13)$$

In some examples, the inverse matrix can be precalculated (or predetermined) and stored in memory. Multiplying the left-hand side of Equation 11 by Equation 12 can lead to:

$$\begin{bmatrix} 0.5 & -0.5 & 0.5 \\ -0.5 & 0.5 & 0.5 \\ 0.5 & 0.5 & -0.5 \end{bmatrix} \begin{bmatrix} I_1 \\ I_2 \\ I_3 \end{bmatrix} = \begin{bmatrix} I_A \\ I_B \\ I_C \end{bmatrix} \quad (14)$$

Thus, measurement of the intensities (e.g., $I_1$, $I_2$, $I_3$) at the states defined in the encoding matrix E can be used via a dot product with the decoding matrix to recover the desired intensity vs. wavelength signals (e.g., $I_A$, $I_B$, $I_C$).

Noise can be present in one or more signals. Since the multiplexing measurement scheme can include more measurements in a given measurement time than the sequential measurement scheme, less signal independent noise can be included in the measurements, leading to an improved SNR and better measurement accuracy without increasing the measurement time. Additionally, the contribution from signal independent noise sources, such as Johnson noise and detector shot noise, which can be significant sources of noise in spectroscopic measurements can be reduced. Furthermore, one or more components included in the measurement system or the sample can have unstable optical properties (i.e., optical properties that drift over time). The drift in optical properties can be included in each measurement state such that the plurality of measurement signals is significantly or equally affected by the drift. If the measurement system utilizing a reference is also affected by the drift, the drift can be canceled out.

The reduction in signal independent noise for the multiplexing measurement scheme relative to the sequential measurement scheme can be equal to (n+1)/(2×sqrt(n)), where n can be the number of wavelengths (i.e., number of measurement states). For example, a measurement of 51 wavelengths with the multiplexing measurement scheme can lead to a reduction in signal independent noise by a factor of 3.64 relative to the sequential measurement scheme. To achieve the same signal independent noise, the sequential measurement scheme can require a total measurement time that is 13.2 times (i.e., $3.64^2$) longer than the multiplexing measurement scheme.

In some examples, the number of wavelengths measured can be equal to 4n−1, where n is an integer. As a result, the number of measurement states can be equal to 4n−1, where 2n−1 wavelengths are being measured during each state. In some examples, the pattern of measured wavelengths can change within each state, such that each wavelength can be measured for 2n−1 number of states. In general, the improvement in SNR can increase as the number of measured wavelengths increases. However, the maximum number of wavelengths that can be in a single state can reach a limit at 50% (i.e., equal to (2n−1/(4n−1)) as n approaches infinity), which can also be the theoretical limit for forms of multiplexing, such as Fourier encoding.

Figure 4A:
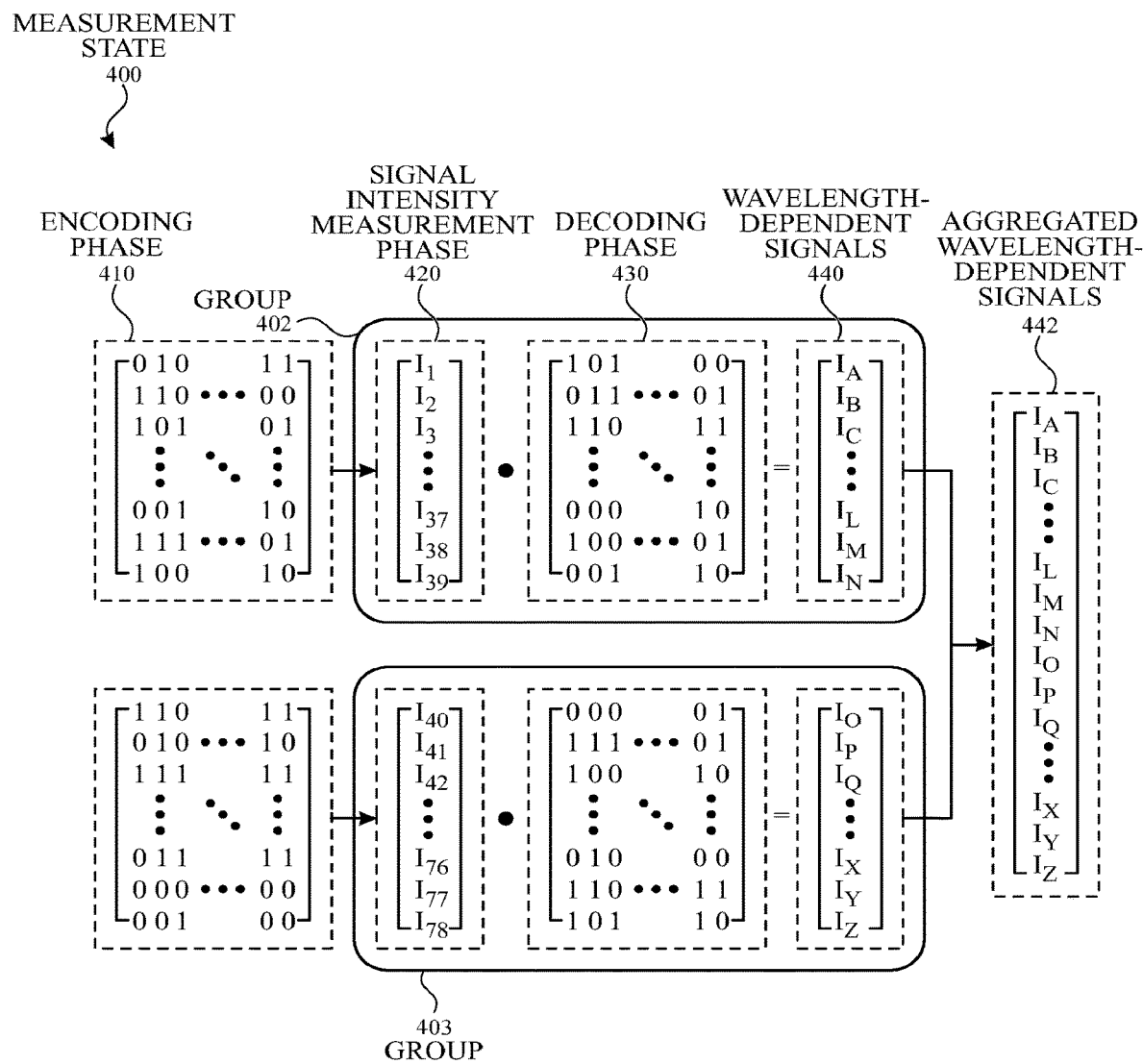
FIG. 4A illustrates a diagram for a measurement utilizing a multiplexing measurement scheme with reference switching according to examples of the disclosure.
Figure 4B:
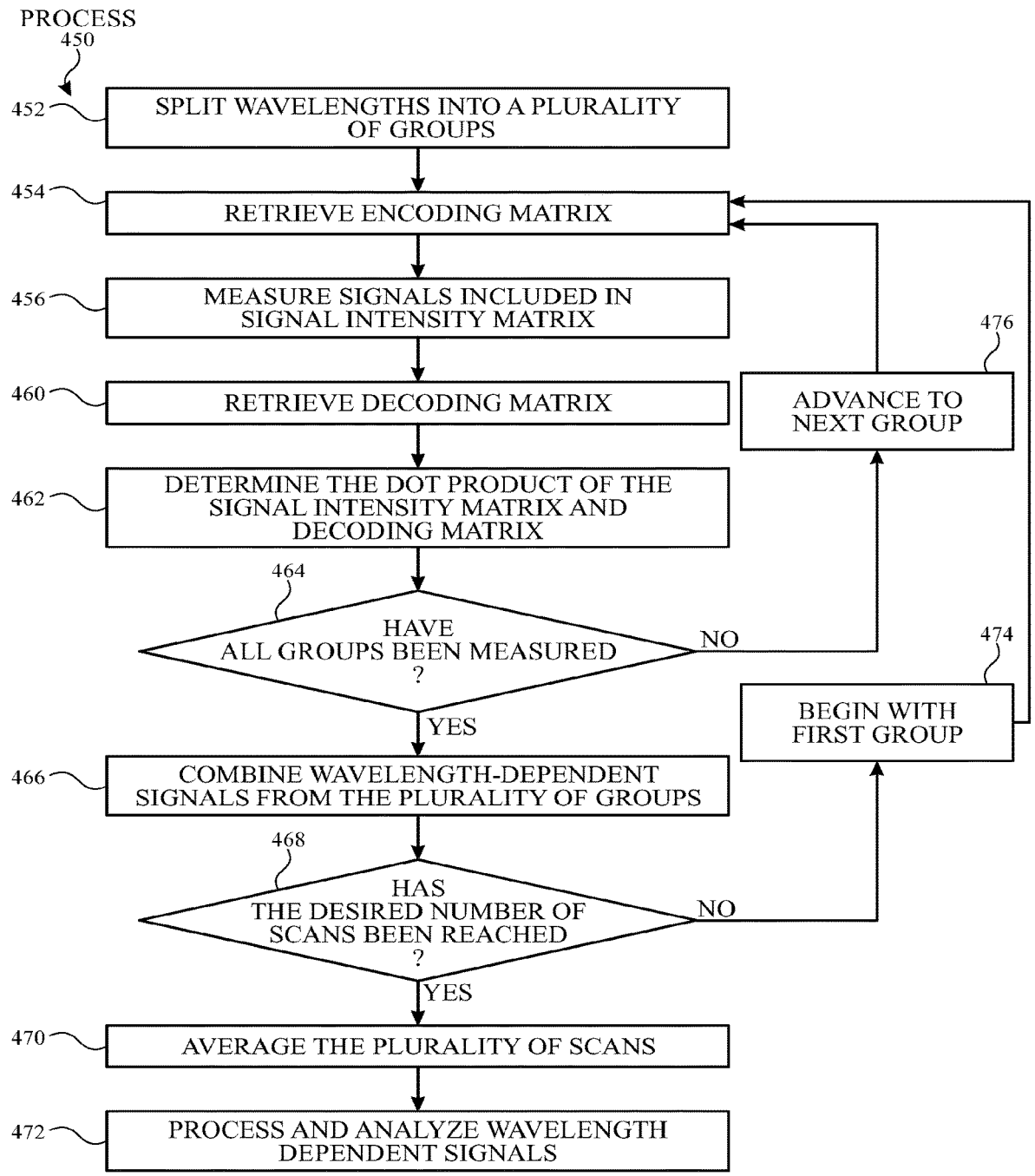
FIG. 4B illustrates a process flow for a multiplexing measurement scheme with reference switching according to examples of the disclosure.

FIG. 4A illustrates a diagram and FIG. 4B illustrates a process flow for a measurement utilizing a multiplexing measurement scheme according to examples of the disclosure. The multiplexing measurement scheme can include measuring the signals across the wavelengths of interest. Measurement state 400 can include encoding phase 410, signal intensity measurement phase 420, and decoding phase 430. Encoding phase 410 can include an encoding matrix, which can include rows corresponding to states to define the wavelengths being measured for that state. Consequently, each row/state can determine the wavelength(s) of light emitting at the sample, reference, or both. The intensity of light after interacting with the sample, reference, or both can be measured and digitized for each state and store in a single intensity matrix included in signal intensity measurement phase 420. Decoding phase 430 can include a decoding matrix. In some examples, the decoding matrix can be the inverse of the encoding matrix. Although not explicitly shown in the figures, examples of the disclosure can include reference switching and corresponding measurement state, encoding phase, signal intensity measurement phase, and decoding phase.

In some examples, measurement state 400 can include m number of wavelengths, where m may not be equal to 4n−1 (where n is an integer). The system can split the wavelengths into a plurality of groups, such as group 402 and group 403, such that the number of wavelengths p in each group is equal to 4n−1 (step 452 of process 450). In some examples, one or more groups included in the plurality of groups can have different sizes or number of wavelengths p (e.g., one group can have seven wavelengths, whereas another group can have eleven wavelengths). An encoding matrix appropriate to the corresponding group can be determined or retrieved from memory (step 454 of process 450). The system can measure the sample intensity for each state of the encoding matrix (step 456 of process 450). Although not illustrated in the figure, the system can also measure the reference intensity for each state of the encoding matrix. In some examples, measurement of the sample intensity and reference intensity can occur simultaneously. A decoding matrix can be determined or retrieved from memory (step 460 of process 450). The dot product of the signal intensity matrix and the decoding matrix included in decoding phase 430 can be determined (step 462 of process 450), resulting in wavelength-dependent signals 440. The process can be repeated for measuring the reference signal and/or dark signal (step 464 of process 450). In some examples, the system can be configured to measure the reference signal, dark signal, or both before the sample signal. The process can also be repeated for measuring the other groups (e.g., group 403) (step 476 of process 450). Wavelength-dependent signals 440 from group 402 and wavelength-dependent signals 440 from group 403 can be combined to form a m×1 matrix of aggregated wavelength-dependent signals 442 (step 466 of process 450), which can represent the measured signal vs. wavelength spectrum. The measurement can be repeated until the desired number of scans has been reached (step 468 and step 474 of process 450), and the measurements from the plurality of scans can be averaged (step 470 of process 450). The controller or processor can process and analyze the wavelength-dependent signals (step 472 of process 450).

For example, the total number of wavelengths m in the measurement can be equal to 78, which may not be equal to 4n−1. The system can split the 78 wavelengths into two groups of 39 wavelengths, which can be equal to 4n−1. The encoding matrix can include a plurality of 1s and 0s, where "1" indicates that the associated light source is turned on, and "0" indicates that the associated light source is turned off. In some examples, the encoding matrix can include a plurality of positive and negative values, where a positive value indicates that the associated light source is turned on, and a negative value indicates that the associated light source is turned off. In some examples, the decoding matrix can be a 39×39 matrix. Although FIG. 4A illustrates 78 wavelengths split into two groups, examples of the disclosure can include a system configured to measure any number of wavelengths. Further, these wavelengths can be split into any number of groups including, but not limited, to two groups. In some examples, each group can have p number of wavelengths such that p is a multiple of 4n−1 when the encoding matrix includes a plurality of positive and negative values (or 4n when the encoding matrix includes a plurality of 1s and 0s). In some examples, p and n are different for at least two groups.

In some examples, measurement of the plurality of groups (e.g., group 402 and group 403) can be performed in any order. In some examples, the measurement of the plurality of groups can be sequential or can be interleaved. In some examples, the system can be configured to alternate between measuring different groups. In some examples, the system can measure one or more groups more often than other groups depending on, for example, the analytical objective or application. For example, four consecutive measurement states can include group 402 measured three times and group 403 measured once. Signals for a group that are measured multiple times in a scan can be averaged prior to decoding or the signals can be averaged after decoding.

As the number of measurement wavelengths increase, the encoding matrix can increase and the improvement in SNR can increase. However, the total shot noise can be uniformly distributed across the measured wavelength-dependent signals and may affect the SNR of the signals associated with one or more wavelengths of interest. In some examples, some wavelengths can be associated with a weaker signal intensity than other wavelengths. As a result, the uniform distribution of the shot noise can degrade the SNR more for those wavelengths with a weaker signal intensity. In some examples, some wavelengths can be associated with more relevant information (e.g., wavelengths corresponding to an absorption peak of a substance of interest), so preventing SNR degradation of the signal can be more important than for other wavelengths. In some examples, the wavelengths with weaker signal intensity and/or wavelengths with more relevant information may be included in different parts of the spectrum. Thus, splitting the wavelengths into groups based on the spectrum may lead to poor SNR and inaccurate measurements.

In some examples, the system can be configured to split the wavelengths into groups based on one or more properties. In some examples, wavelengths with weaker signal intensity can be grouped together, and wavelengths with a stronger signal intensity can be grouped together. In this manner, the stronger signals may not degrade the SNR of the wavelengths with weaker signal intensities. In some examples, the drift properties of two or more wavelengths can vary due to, for example, the stability of the optical sources, modulators, waveguides, mirrors, and/or beamsplitters. Wavelengths can be grouped based on similarity of drift because otherwise grouping of dissimilar drifting components can lead to degradation of the entire group. The measurement conditions can be optimized for each group based on the amount of drift. In some examples, wavelengths can be grouped based on a targeted total SNR. In some examples, the targeted total SNR can be based optimal conditions for a readout scheme, such as maximizing the usage of an ADC in the readout.

In some examples, wavelengths can be grouped based on individual optical power detected by the detector. In some examples, white noise can be distributed across the wavelengths. As a result, some wavelengths can have a higher photon noise and can distribute its noise to wavelengths with less photon noise. In some examples, the system can group the wavelengths with higher photon noise together if these wavelengths include more relevant information. In some examples, the wavelengths with less photon noise can include information that is more relevant, so separating the wavelengths with higher photon noise from wavelengths with less photon noise can prevent photon shot noise from the group with higher photon noise from degrading the SNR of the group with lower photon noise.

In some examples, the groups can be separated into longer wavelengths and shorter wavelengths. Longer wavelengths can have a stronger attenuation than shorter wavelengths, which can lead to less light detected by the detector for longer wavelengths. Thus, if signal dependent noise (e.g., photon noise) is significant, SNR can be improved for the longer wavelength signals compared to signals from both shorter and longer wavelengths grouped together. By grouping the longer wavelength signals together and the shorter wavelength signals together, the SNR can be improved by 3.2 (i.e., 40/(2×sqrt (39))) when the noise is dominated by signal independent noise.

In some examples, wavelengths can be grouped based on location within one or more spectroscopic devices. In some examples, the location can be selected based on minimizing heat load, heat dissipation, and/or temperature-dependent wavelength shifts. In some examples, wavelengths can be grouped based on the material properties of the light sources. In some examples, wavelengths derived from light sources fabricated from similar materials can be grouped together. Some materials may have different requirements or performance (e.g., requires more electrical power or may generate more thermal power), so these variables can be considered when optimizing the conditions for each group.

In some examples, the components can be grouped based on one or more properties, such as electrical power. For example, the electrical power requirements can differ based on wavelengths, so the laser channels can be grouped such that the electrical power requirement is the same across the spectroscopic measurement. Configuring the system with a consistent electrical power requirement can minimize the total power required for measurement and/or can minimize fluctuations in the power profile such that transients and large differences between the minimum and maximum power drawn can be minimized.

In some examples, the measurement times for two or more groups can be different. In some examples, the wavelengths can be split based on relevance. Wavelengths with more relevant information (e.g., includes an absorbance peak for a substance of interest) can be grouped together and wavelengths with less relevant information can be grouped together. The measurement time for the wavelengths with more relevant information can be greater than the measurement time for the wavelengths with less relevant information. In some examples, the total measurement time for a measurement state (i.e., one pass through all encoding states to obtain a spectrum) can be based on the frequency of the flicker noise and/or sample drift. The multiplexing measurement scheme can minimize the impact of the source flicker noise and/or sample drift when the system is configured such that the total measurement time coincides with the frequency of source flicker noise and/or sample drift. In some examples, the wavelengths can be split based on SNR values or levels. For examples, one or more first groups can include wavelengths with poor SNR, and one or more second groups can include wavelengths with good SNR (i.e., better SNR values or levels than the one or more first groups). In some examples, the measurement time for a given group can be based on the target SNR of the group. In some examples, the measurement time for the group(s) with worse SNR can be increased or higher than the measurement time for the group(s) with better SNR.

In addition to wavelength multiplexing, examples of the disclosure can include sample location multiplexing. In some examples, a sample can be measured or illuminated at multiple locations. In some examples, the multiple locations in the sample can be measured at the same wavelengths. Position multiplexing and wavelength multiplexing can form a nested multiplexing measurement scheme. By combining position multiplexing and wavelength multiplexing in a nested fashion, the SNR can be improved. For example, measurements of intensity across a wavelength spectrum for multiple positions can be desired. Multiple positions can be measured with a first encoding scheme. Within each state of the position encoding, the signal intensity can be measured for a series of wavelength encoding state such that multiple wavelengths can be measured with this second encoding scheme. That is, the second encoding scheme can encode wavelength, while the first encoding scheme can encode position. In some examples, position multiplexing can be completed at the same time as wavelength multiplexing.

Figure 5A:
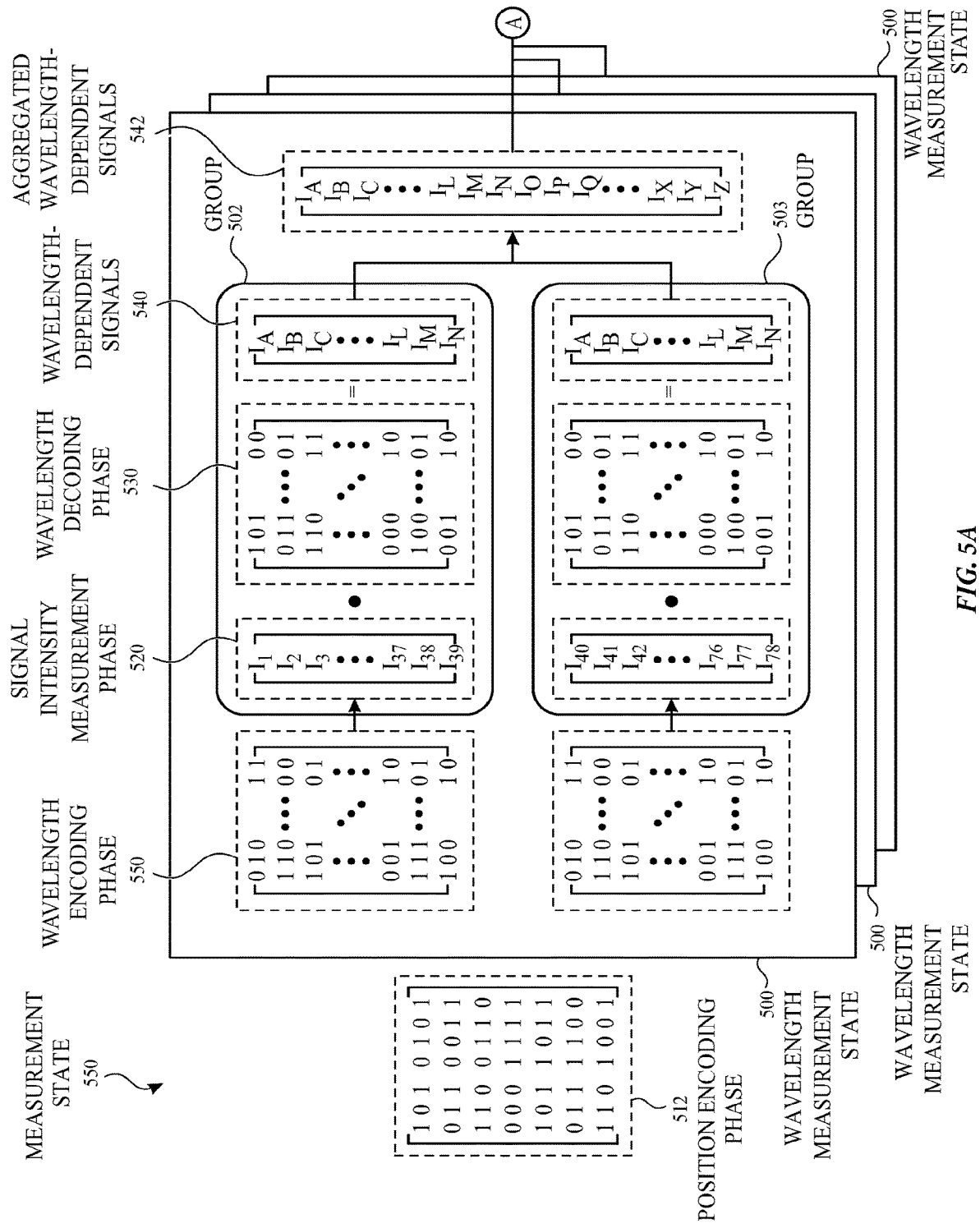
FIG. 5A illustrates a diagram for a measurement utilizing a nested multiplexing scheme according to examples of the disclosure.
Figure 5A:
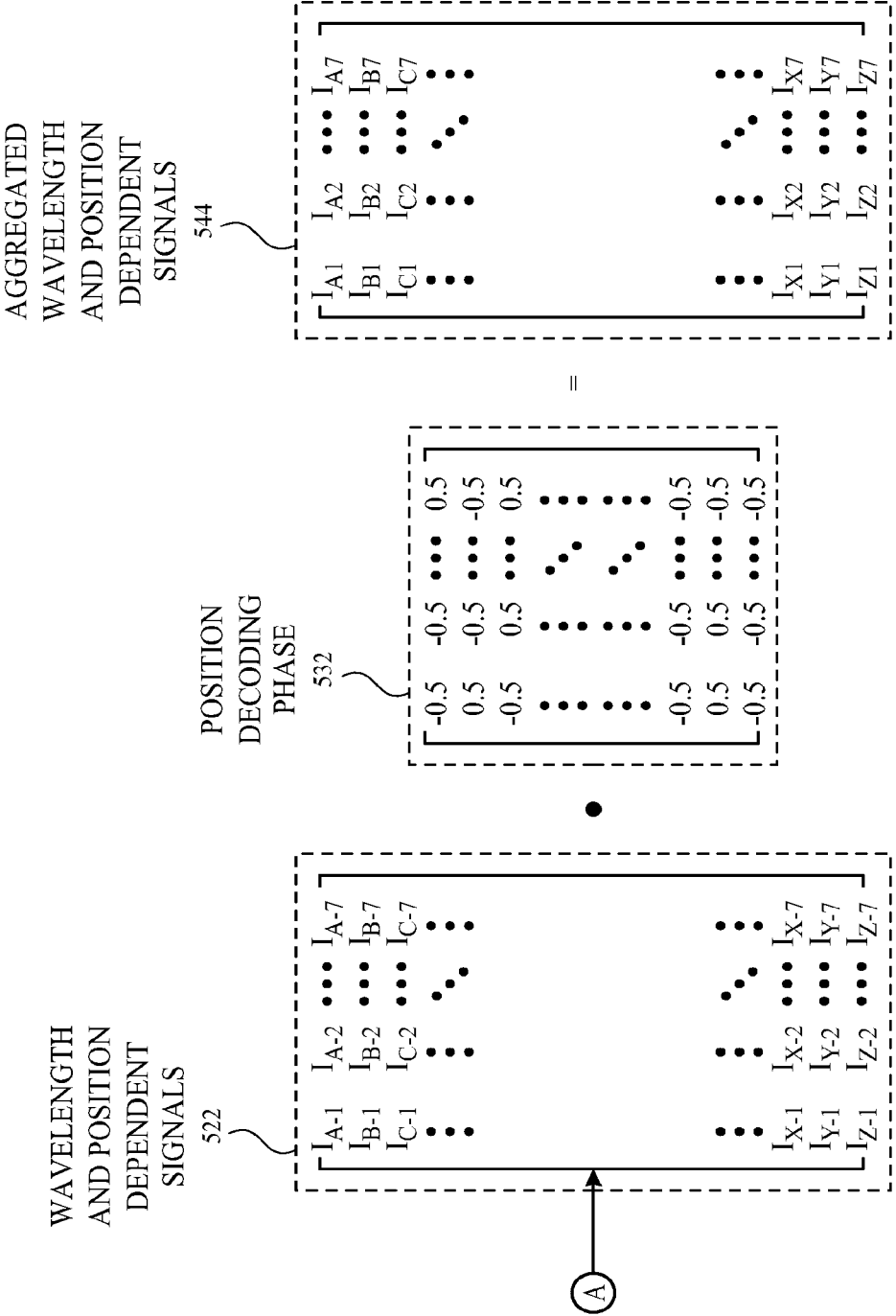
Figure 5B:
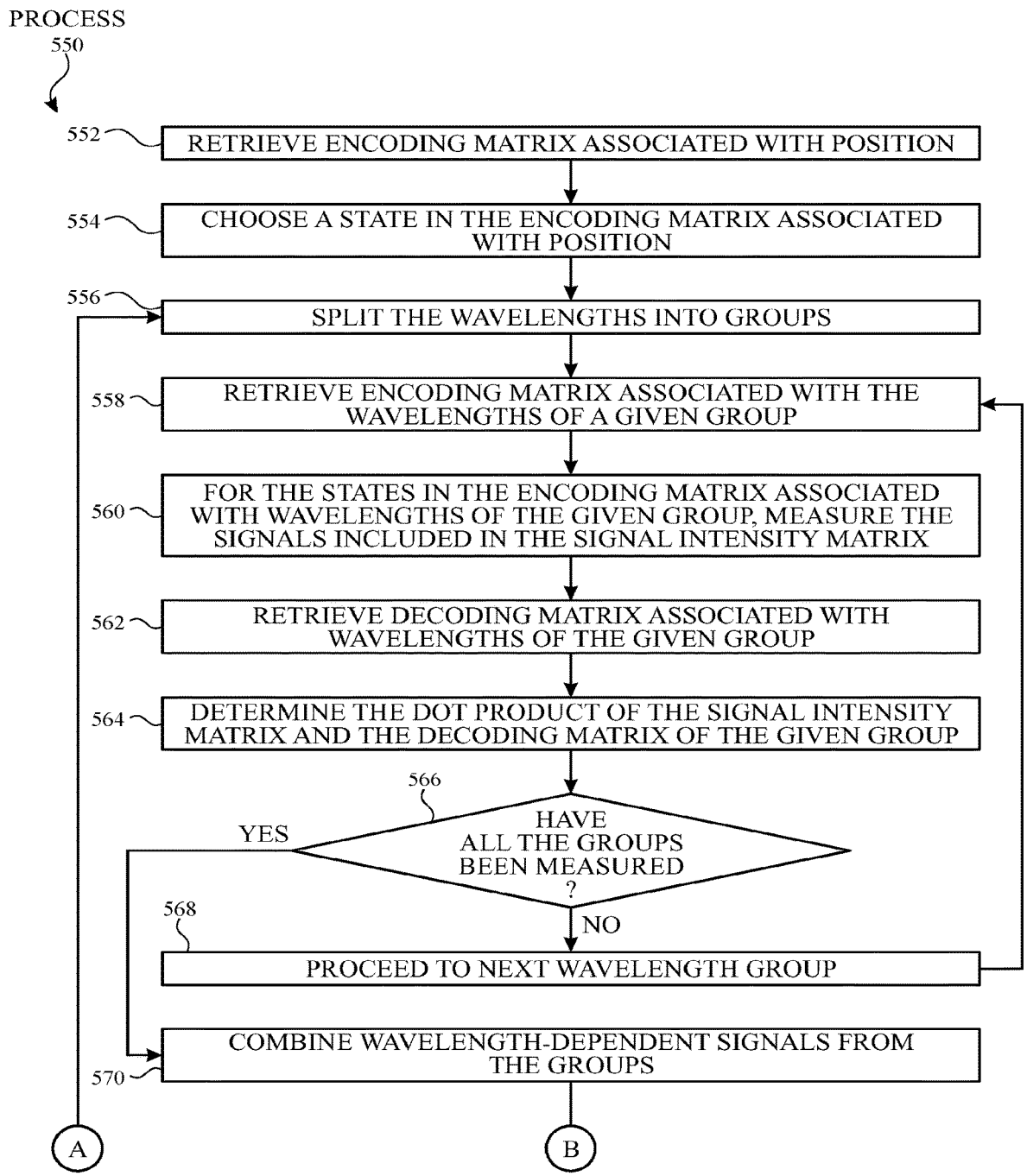
FIG. 5B illustrates a process flow for a nested multiplexing scheme according to examples of the disclosure.
Figure 5B:
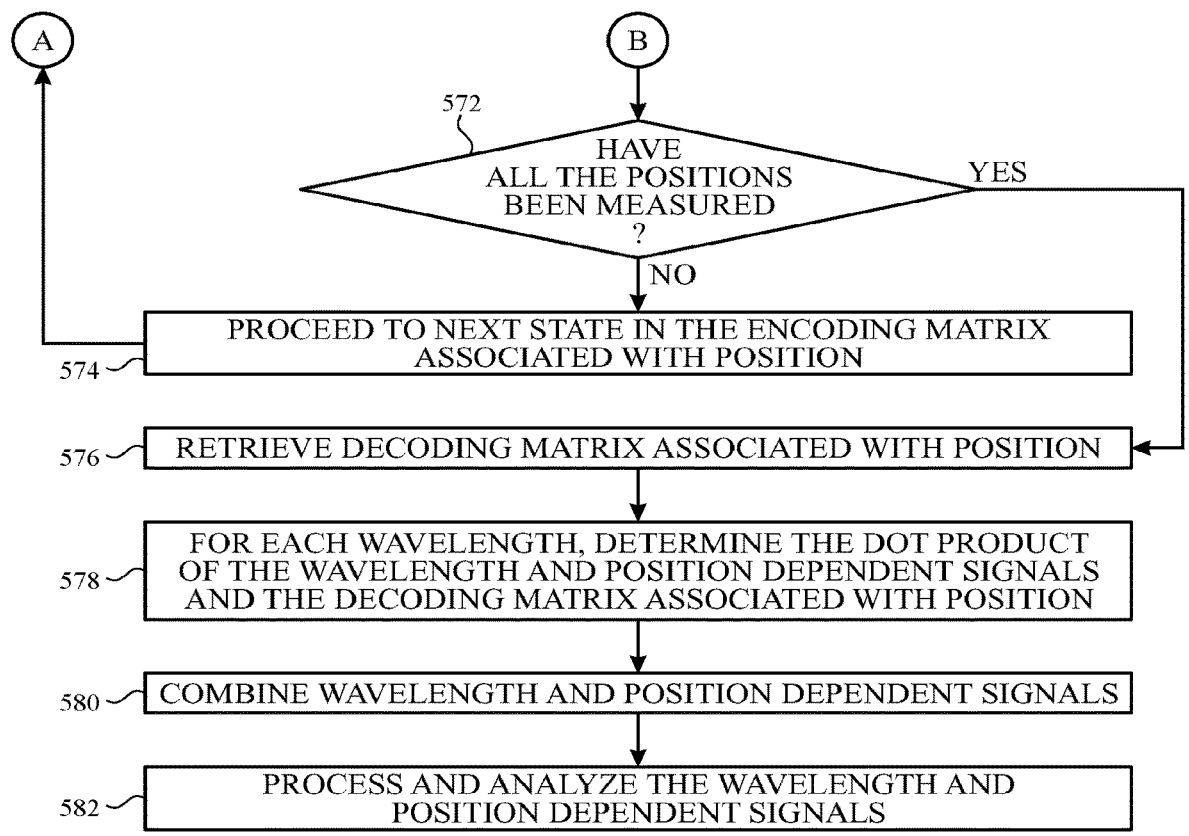

FIG. 5A illustrates a diagram and FIG. 5B illustrates a process flow for a measurement utilizing a nested multiplexing scheme according to examples of the disclosure. The nested multiplexing measurement scheme can include measuring the signal intensity as a function of wavelength and position (i.e., sample location). Measurement state 590 can include position encoding phase 512, a plurality of wavelength measurement states 500, and position decoding phase 532. Position encoding phase 512 can include an encoding matrix, which can include rows to define the encoding state for each position being measured. Each wavelength measurement state 500 can include wavelength encoding phase 510, signal intensity measurement phase 520, and wavelength decoding phase 530. Wavelength encoding phase 510 can include an encoding matrix, which can include rows corresponding to states that define the wavelengths being measured for that states. Consequently, a row/state can determine the wavelengths of light that are emitted at the sample and reference. The intensity of light after interacting with the sample or reference can be measured and digitized for each state and store in the signal intensity matrix included in signal intensity measurement phase 520. Wavelength decoding phase 530 can include a decoding matrix. In some examples, the decoding matrix for the wavelength decoding phase 530 can be the inverse of the encoding matrix included in the wavelength encoding phase 510. Position decoding phase 532 can include a decoding matrix. In some examples, the decoding matrix for position decoding phase 532 can be the inverse of the position matrix included in the position encoding phase 512.

In some examples, measurement state 590 can include k number of positions. Each wavelength measurement state 500 can be associated to a different position. Each measurement state 500 can include m number of wavelengths, where m may not be equal to $4n-1$ (where n is an integer). An encoding matrix associated with position can be determined or retrieved from memory (step 552 of process 550). The system can choose a state in the position encoding matrix (step 554 of process 550). The system can split the wavelengths into a plurality of groups, such as group 502 and group 503, such that the number of wavelengths p in each group is equal to $4n-1$ (step 556 of process 550). For a given wavelength group, the encoding matrix associated with the wavelengths of the given wavelength group can be retrieved (step 558 of process 550). The system can measure the sample intensity for each state of the encoding matrix associated with wavelengths to determine the signal values includes in the signal intensity measurement phase 520 (step 560 of process 550). Although not illustrated in the figure, the system can also measure the reference intensity for each state of the encoding matrix. In some examples, measurement of the sample intensity and reference intensity can occur simultaneously. A decoding matrix associated with wavelengths of the given group can be determined or retrieved from memory (step 562 of process 550). The dot product of the signal intensity matrix included in the signal intensity measurement phase 520 and the decoding matrix included in wavelength decoding phase 530 can be determined (step 564 of process 550), resulting in wavelength-dependent signals 540. The process can be repeated for measuring the reference signal and/or dark signal. The process can be repeated for other groups (e.g., group 503) (step 566 and step 568 of process 550). Wavelength-dependent signals from group 502 and wavelength-dependent signals from group 503 can be combined (step 570 of process 550) to form a m×1 matrix of aggregated wavelength-dependent signals 542, which can represent the measured signal vs. wavelength spectrum for a given position. The measurement can be repeated until all of the positions on the sample have been measured (steps 572 and step 574 of process 550). A decoding matrix associated with position can be determined or retrieved from memory (step 576 of process 550). For each wavelength of interest, the dot product of the wavelength and position dependent signals 522 and the decoding matrix associated with position (included in position decoding phase 532) can be determined (step 578 of process 550). The wavelength and position dependent signals 544 can be combined or aggregated to form a m×k matrix of measured signals vs. wavelength vs. position (step 580 of process 550). The controller or processor can process and analyze the wavelength and position dependent signals (step 582 of process 550). Although examples of FIGS. 5A-5B illustrate wavelength multiplexing nested in position multiplexing, examples of the disclosure can include position multiplexing nested in wavelength multiplexing.

For example, the total number of positions k in the measurement can be equal to seven. The total number of wavelengths m in the measurement can be equal to 78, which may not be equal to $4n-1$. The system can split the 78 wavelengths into two groups of 39 wavelengths, which can be equal to $4n-1$. The encoding matrix can include a plurality of 1s and 0s, where "1" can indicate that the associated light source is turned on, and "0" can indicate that the associated light source is turned off. The SNR improvement at each wavelength compared to the sequential measurement can be 4.84 (i.e., $(39+1)/(2\times\operatorname{sqrt}(39))\times(7+1)/(2\times\operatorname{sqrt}(7))$). Additionally, the sequential measurement can require 23.4 times (i.e., $4.84^2$) longer measurement to achieve the same SNR.

The system can be configured to split the wavelengths into groups based on one or more properties. As discussed above in the context of FIGS. 8A-8B, exemplary properties can include, but are not limited to, signal intensity, drift properties of one or more components in the system, targeted total SNR, location within one or more spectroscopic devices, material properties of the light sources, individual optical power detected by the detector, and photon noise. Although FIG. 5A illustrates two levels of encoding, examples of the disclosure can include any number of levels of encoding. For example, the system can be configured with three levels of encoding: position multiplexing, wavelength multiplexing, and detector state (e.g., dark measurement, reference measurement, or sample measurement) multiplexing. Additionally, although the signal intensity matrix included in signal intensity measurement phase 520, wavelength dependent signals 540, and aggregated wavelength-dependent signals 542 are illustrated as row matrices, examples of the disclosure can include the matrices being column matrices, and the decoding matrix can be configured accordingly.

Figure 5C:
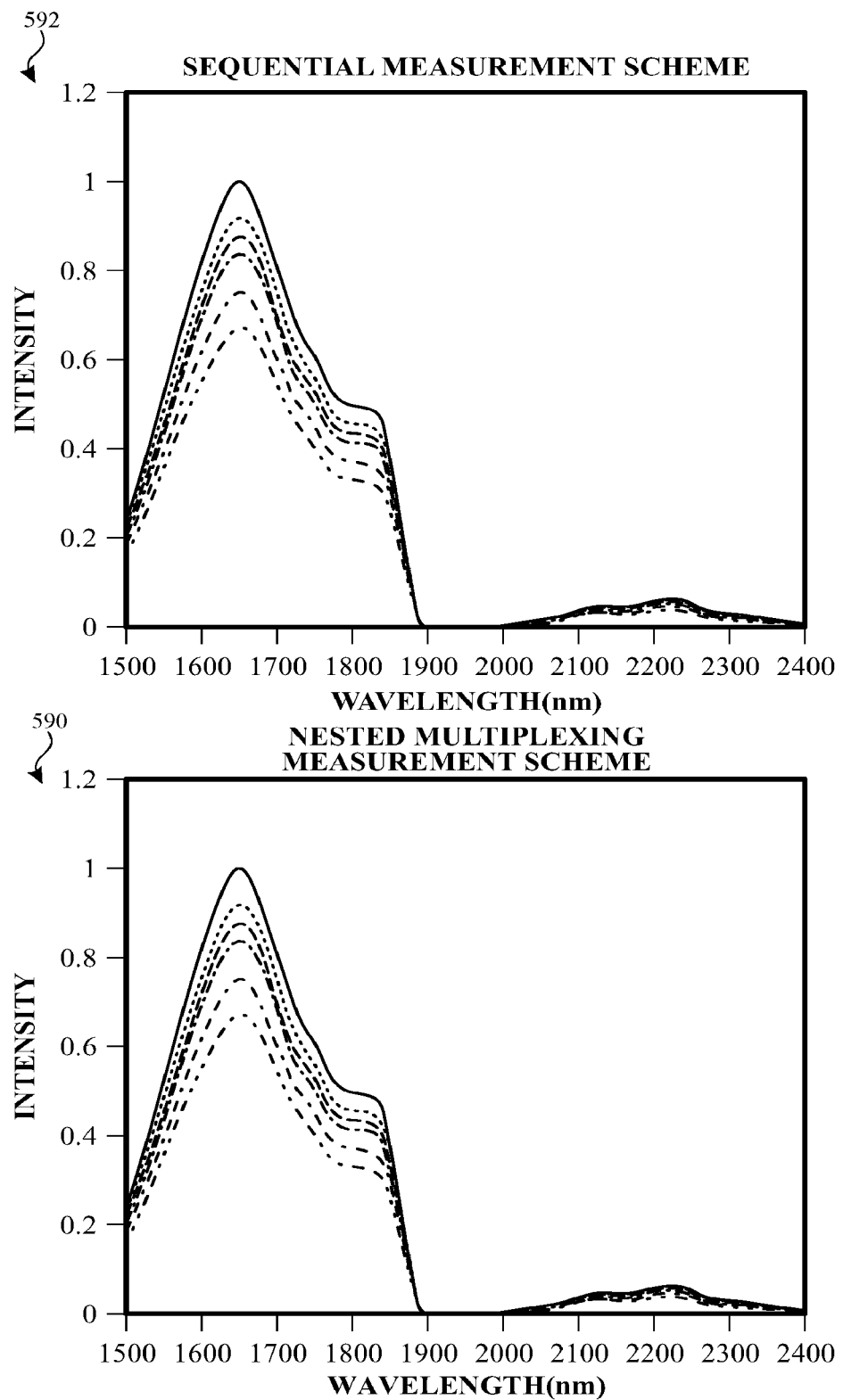
FIG. 5C illustrates plots of signal intensity as a function of wavelength for an exemplary sequential measurement and an exemplary nested multiplexing measurement according to examples of the disclosure.
Figure 5D:
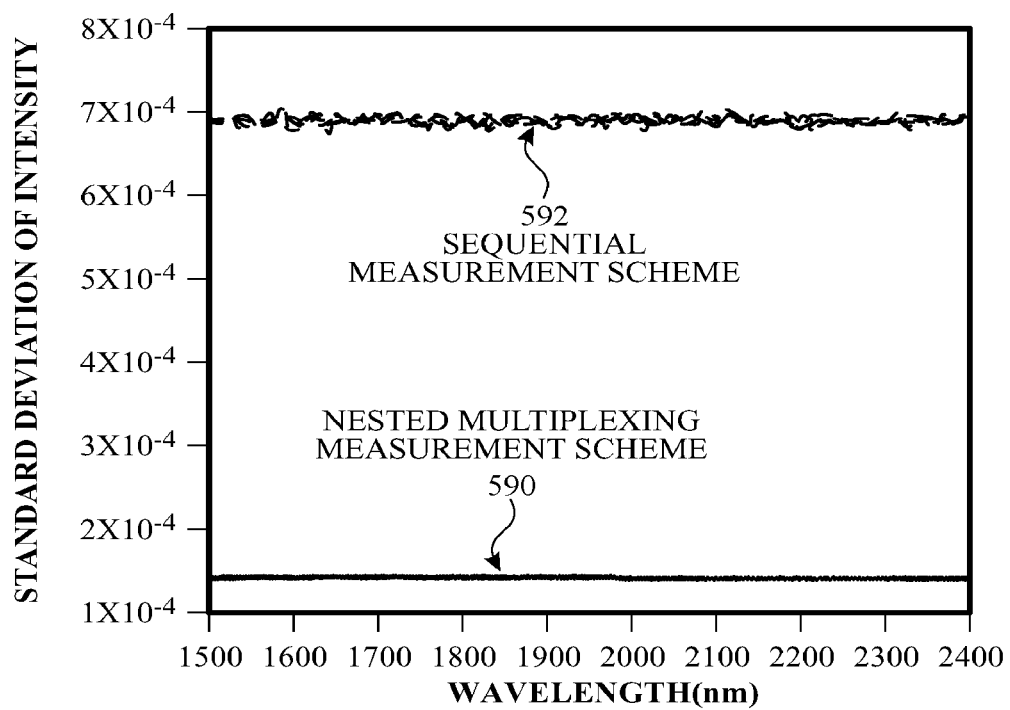
FIG. 5D illustrates the standard deviation of intensity for an exemplary sequential measurement and an exemplary nested multiplexing measurement according to examples of the disclosure.

FIG. 5C illustrates plots of signal intensity as a function of wavelength and FIG. 5D illustrates the standard deviation of intensity for an exemplary sequential measurement and an exemplary nested multiplexing measurement according to examples of the disclosure. The system can be configured to measure seven positions along the sample across 78 wavelengths linearly spaced between 1500-2400 nm. In nested multiplexing measurement scheme 590, the wavelengths can be split into two groups. One group can include shorter (e.g., the first 39) wavelengths, and the other group can include longer (e.g., the last 39) wavelengths. The time for each measurement state for both sequential measurement scheme 592 and nested multiplexing measurement scheme 590 can be the same. Although the plots illustrated in FIG. 5C for sequential measurement scheme 592 and nested multiplexing measurement scheme 590 can have identical signal intensities across the wavelengths of interest, the noise can differ, as illustrated in FIG. 5D. Standard deviation of intensity can be lower for nested multiplexing measurement scheme 590 than the standard deviation of intensity for the sequential measurement scheme 592 due to the multiplexing resulting in lower signal independent noise.

Figure 5E:
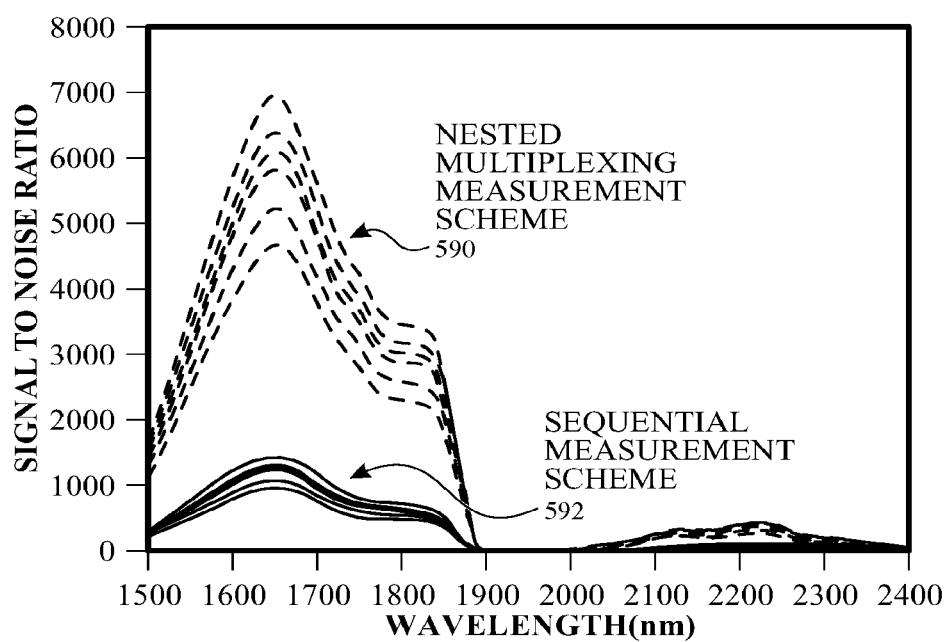
FIG. 5E illustrates a plot of SNR as a function of wavelength for an exemplary sequential measurement and an exemplary nested multiplexing measurement according to examples of the disclosure.

FIG. 5E illustrates a plot of SNR as a function of wavelength for an exemplary sequential measurement and an exemplary nested multiplexing measurement according to examples of the disclosure. The SNR for the nested multiplexing measurement scheme 590 can be higher than the SNR for the sequential measurement scheme 592. For example, the ratio of the SNRs can be equal to 4.84 at all wavelengths in the spectrum.

Figure 6A:
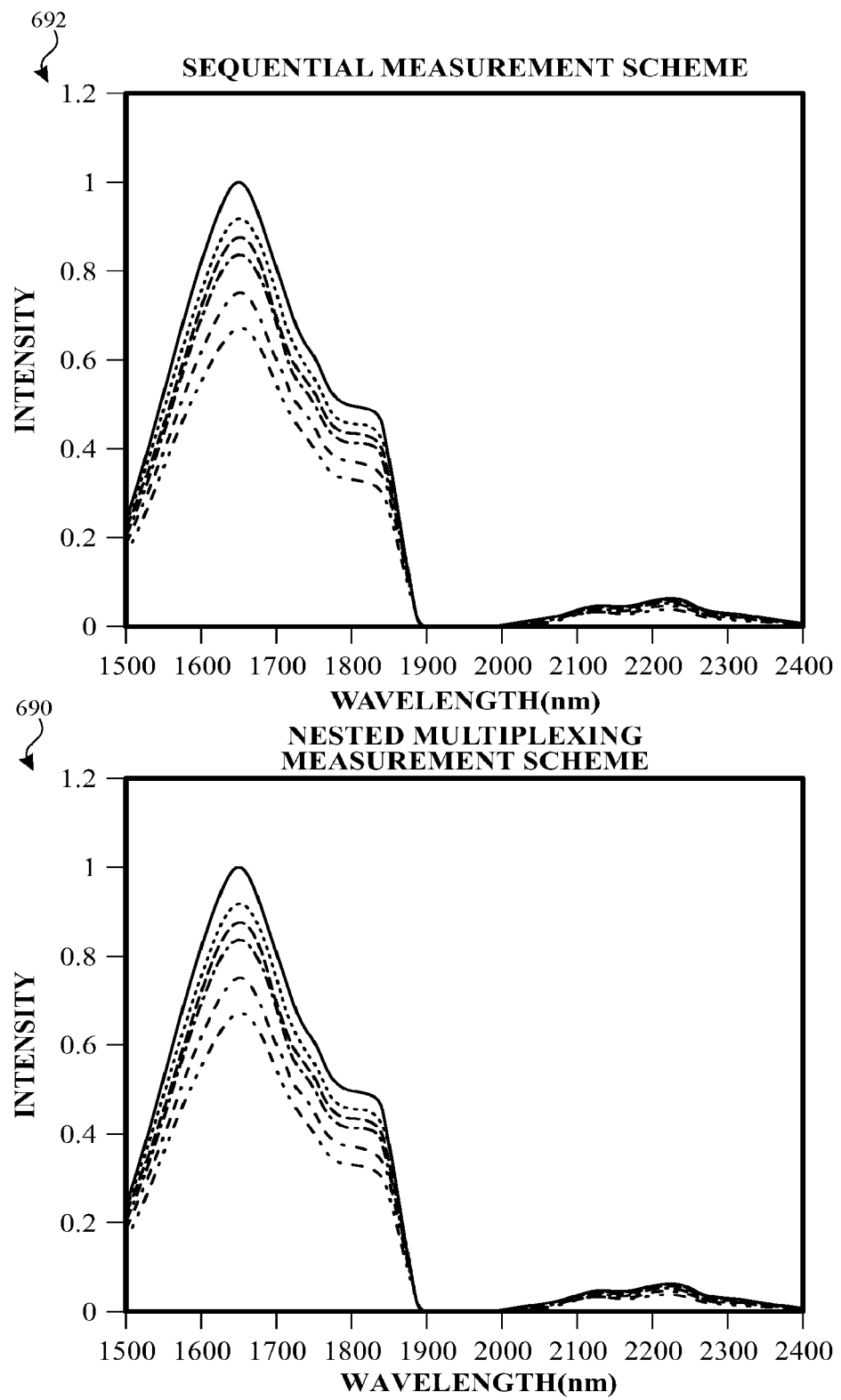
FIG. 6A illustrates plots of signal intensity as a function of wavelength for an exemplary sequential measurement and an exemplary nested multiplexing measurement according to examples of the disclosure.
Figure 6B:
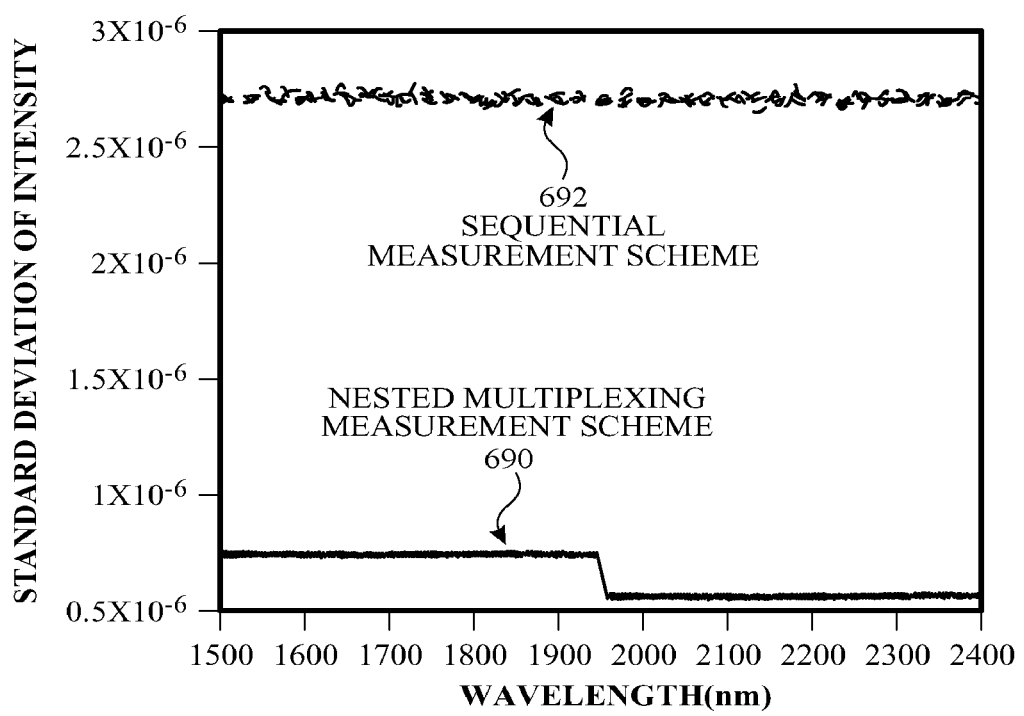
FIG. 6B illustrates the standard deviation of intensity for an exemplary sequential measurement and an exemplary nested multiplexing measurement according to examples of the disclosure.

In some examples, the photocurrent can be of the same magnitude as the signal independent noises (e.g., Johnson noise and detector noise). FIG. 6A illustrates plots of signal intensity as a function of wavelength and FIG. 6B illustrates the standard deviation of intensity for an exemplary sequential measurement and an exemplary nested multiplexing measurement according to examples of the disclosure. The measurement can be configured to measure seven positions along the sample across 78 wavelengths linearly spaced between 1500-2400 nm. In nested multiplexing measurement scheme 690, the wavelengths can be split into two groups. One group can include shorter (e.g., the first 39) wavelengths, and the other group can include longer (e.g., the last 39) wavelengths. The time for each measurement state in both sequential measurement scheme 692 and nested multiplexing measurement scheme 690 can be the same. Due to the higher photocurrents, the relative amounts of signal dependent (photon) noise and signal independent noises can be lower (than compared to the plots illustrated in FIGS. 9C-9E, for example). Due to the higher relative signal dependent noise relative to the signal independent noises, shorter wavelengths can have higher intensities than longer wavelengths. In nested multiplexing measurement scheme 690, since shorter wavelengths can be grouped together, and longer wavelengths can be grouped together, the standard deviation of intensity for the shorter wavelength group can be higher than the standard deviation of intensity for the longer wavelength group. On the other hand, in sequential measurement scheme 692, shorter wavelengths can be grouped together with longer wavelengths. As a result, noise from wavelengths with higher relative signal dependent noise can affect other wavelengths. If the more relevant wavelengths have a weaker intensity and are affected by noise by wavelengths with higher relative signal dependent noise, the measurement can be inaccurate. Instead, the nested multiplexing measurement can prevent SNR degradation by optimizing each group according to the SNR, for example.

Examples of the disclosure can include any encoding and multiplexing including, but not limited to, Hadamard code, Walsh code, Walsh-Hadamard code, Sylvester matrices, Sylvester-Hadamard matrices, Hamming code, Repetition code, Zadoff-Chu sequences, Gray code, and Fourier encoding or modulation. In some examples, the encoding scheme used for a level (e.g., wavelength multiplexing) can be different from the encoding scheme used in another level (e.g., position multiplexing). For example, wavelength multiplexing can include Fourier encoding, and position multiplexing can include a Hadamard code.

Additionally or alternatively to grouping of wavelengths (as discussed above), examples of the disclosure can include grouping of components in the system. Referring back to FIG. 6A, a system can be configured with one or more of the disclosed multiplexing measurement schemes and nested multiplexing measurement schemes. The light sources included in system 600 can include an integrated light source with a plurality of individual laser channels that can emit light spanning the spectrum of wavelengths of interest. The laser channels can be fixed or tunable. In some examples, the integrated light source can include a plurality of III-V semiconductor chips integrated onto a silicon photonic platform, where light can be coupled from III-V semiconductor chips to the silicon chip using optical traces 606, for example. For example, the plurality of lasers together can span the full gain bandwidth of the semiconductor material. In some examples, single mode laser ridges can be fabricated such that many laser devices can fit within a chip. In some examples, a laser ridge can have a width of 1-3 μm, and the lateral dimensions of the plurality of lasers can be less than 1000 μm.

In some examples, locating the lasers within close proximity to each other can lead to thermal spreading from one laser to other lasers. For example, the system can be configured with 12 laser chips emitting in the SWIR wavelength range from 1500-2400 nm. Each chip can have an emission bandwidth of 75 nm and a chip width of 350 μm. The application can require 80 discrete wavelengths, which can lead to seven wavelengths per chip. However, due to thermal spreading or thermal crosstalk, each laser chip can be limited to three laser channels, limiting the total number of discrete wavelengths to 36. To overcome this limitation to the number of wavelengths due to thermal spreading, the system can be configured to utilize groups of laser channels. The channels can be grouped such that laser channels that are concurrently activated have a reduced thermal spreading effect, thereby increasing the number of discrete wavelengths the system can measure at a time. In some examples, the system can be configured with a broadband light source and an optical component configured to spatially separate different wavelengths of light. In some examples, the optical component can be a prism or grating.

To implement the multiplexing measurement scheme and nested multiplexing measurement scheme, the system can be configured to include any type of component capable of modulation. The component can be used to control which wavelengths of light are allowed to pass through to the optical path of interest (e.g., sample optical path or reference optical path). Examples of the disclosure can include, but are not limited to, electronic modulation, mechanical modulation, optical modulation, or a combination thereof. In some examples, modulation can include turning on and off the light sources. In some examples, the system can include a MEMS mirror for modulation. In some examples, the system can include a data light processing (DLP) component for modulation. In some examples, the system can include a mechanical chopper. In some examples, the mechanical chopper can be designed with a pattern that is associated with the encoding scheme or encoding matrix. For example, a mechanical chopper wheel can be designed to have a different pattern of block and pass states for each wavelength or group of wavelengths.

One or more of the functions described above can be performed, for example, by firmware stored in memory and executed by a processor or controller. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

A method for measuring one or more properties of a substance in a sample. In some examples, the method comprises: emitting a first set of light at the sample, the first set of light associated with a first state of a first property; emitting a second set of light at the sample, the second set of light associated with a second state of the first property, where the first and second states of the first property are based on a first measurement state information; measuring a first signal, the first signal including an intensity associated with the first set of light; measuring a second signal, the second signal including an intensity associated with the second set of light; and determining the one or more properties of the substance based at least on the first and second, signals. Additionally or alternatively, in some examples, the method further comprises: assigning the first signals to a first group; assigning the second signals to a second group; and determining a first property-dependent signals from the first and second groups. Additionally or alternatively, in some examples, the first property is wavelength and the first group includes shorter wavelengths than the second group. Additionally or alternatively, in some examples, the first property is wavelength and the first group includes lower signal intensities than the second group. Additionally or alternatively, in some examples, the method assignment of signals to the first group and assignment of signals to the second group is based on drift similarity. Additionally or alternatively, in some examples, the method further comprises: determining a targeted signal-to-noise ratio, wherein the assignment of signals to the first group and the assignment of signals to the second group are such that a total signal-to-noise ratio of all signals in the first group and a total signal-to-noise ratio of all signals in the second group are less than the target signal-to-noise ratio. Additionally or alternatively, in some examples, the first group includes signals associated with a first property of spectroscopic devices and the second group includes signals associated with a second property of spectroscopic devices. Additionally or alternatively, in some examples, the first group includes signals associated with absorption peaks corresponding to a first substance and the second group includes signals associated with absorption peaks corresponding to a second substance. Additionally or alternatively, in some examples, the first group has a measurement time different from the second group. Additionally or alternatively, in some examples, the method further comprises: measuring the plurality of signals included in the first group before measuring the plurality of signals included in the second group. Additionally or alternatively, in some examples, the method further comprises: measuring the plurality of signals included in the first group; and measuring the plurality of signals included in the second group, wherein the measurement of the plurality of signals included in the first group are interleaved with the measurement of the plurality of signals included in the second group. Additionally or alternatively, in some examples, the method further comprises: emitting a third set of light at a reference, the third set of light associated with the first state of the first property; emitting a fourth set of light at the reference, the fourth set of light associated with the second state of the first property; and measuring a third signal, the third signal including an intensity associated with the third set of light; measuring a fourth signal, the fourth signal including an intensity associated with the fourth set of light, wherein determining the one or more properties of the substance is further based on at least the third and fourth signals. Additionally or alternatively, in some examples, the method further comprising: assigning the first and third signals to a first group; assigning the second and fourth signals to a second group; and determining a first property-dependent signals from the first and second groups. Additionally or alternatively, in some examples, the method further comprises: measuring the plurality of signals included in the first group for a plurality of scans; measuring the plurality of signals included in the second group for the plurality of scans; decoding the plurality of signals included in the first group before averaging the measured plurality of signals included in the first group for the plurality of scans; and decoding the plurality of signals included in the second group before averaging the measured plurality of signals included in the second group for the plurality of scans. Additionally or alternatively, in some examples, the method further comprises: measuring the plurality of signals included in the first group for a plurality of scans; measuring the plurality of signals included in the second group for the plurality of scans; decoding the plurality of signals included in the first group after averaging the measured plurality of signals included in the first group for the plurality of scans; and decoding the plurality of signals included in the second group after averaging the measured plurality of signals included in the second group for the plurality of scans. Additionally or alternatively, in some examples, the method further comprises: emitting a fifth set of light at the sample, the fifth set of light associated with the first and second states of the first property and a first state of a second property; emitting a sixth set of light at the sample, the sixth set of light associated the first and second states of the first property with a second state of the second property, wherein the first and second states of the second property are based on a second measurement state information; measuring a fifth signal, the fifth signal including an intensity associated with the fifth set of light; and measuring a sixth signal, the sixth signal including an intensity associated with the sixth set of light, wherein the determination of the one or more properties of the substance is further based on the fifth and sixth signals. Additionally or alternatively, in some examples, the first property is one of wavelength, position on the sample, or detector, and the second property is the other of wavelength, position on the sample, or detector. Additionally or alternatively, in some examples, the first property is the same as the second property. Additionally or alternatively, in some examples, the method further comprises: emitting a seventh set of light at the sample, the seventh set of light associated with the first and second states of the second property and a first state of a third property; emitting an eighth set of light at the sample, the eighth set of light associated with the first and second states of the second property, and a second state of the third property, wherein the first and second states of the third property are based on a third measurement state information; measuring a seventh signal, the seventh signal including an intensity associated with the seventh set of light; and measuring an eighth signal, the sixth signal including an intensity associated with the eighth set of light, wherein the determination of the one or more properties of the substance is further based on the seventh and eighth signals.

A system for determining one or more properties of a substance in a sample is disclosed. The system can comprise: a plurality of light sources configured to emit a first light incident on the sample; a plurality of lenses configured to collect at least a portion of a reflection of the first light; one or more detector pixels configured to detect at least a portion of the reflected first light; and a first modulator configured to allow or block light from one or more of the plurality of light sources based on a first measurement state information. Additionally or alternatively, in some examples, the plurality of light sources is further configured emit a second light incident on a reference, and further wherein the one or more detector pixels are further configured to detect at least a portion of a reflection of the second light. Additionally or alternatively, in some examples, the first measurement state information is associated with one of wavelength, position on the sample, or state of the detector pixels. Additionally or alternatively, in some examples, the system further comprises: a second modulator configured to allow or block light from the plurality of light sources based on a second measurement state information. Additionally or alternatively, in some examples, the first modulator is one of a data light processing component, mechanical chopper, and microelectromechanical system (MEMs). Additionally or alternatively, in some examples, each of the plurality of light sources are assigned to one of a plurality of groups based on a thermal spreading or electrical power of the plurality of light sources, each group including light sources that are activated concurrently.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method for performing measurements of a sample at a set of positions using a measurement system, comprising:
    retrieving, using a processor of the measurement system, a position encoding matrix associated with a set of positions;
    selecting a first subset of positions of the set of positions from the position encoding matrix;
    separating a set of wavelengths into groups of wavelengths;
    retrieving a first wavelength encoding matrix associated with a first group of wavelengths of the groups of wavelengths;
    emitting, using the measurement system, the first group of wavelengths into the sample; and
    measuring, using the measurement system, an intensity for the first group of wavelengths returned from the sample at each position of the first subset of positions.

2. The method of claim 1, further comprising:
    retrieving a wavelength decoding matrix associated with the first group of wavelengths;
    producing an associated first group of wavelength dependent signals at each position of the subset of positions by using the wavelength decoding matrix and the intensity measurements of the first group of wavelengths;
    retrieving a second wavelength encoding matrix associated with a second group of wavelengths of the groups of wavelengths; and
    measuring the intensity for each wavelength of the second group of wavelengths at each position of the first subset of positions.

3. The method of claim 1, further comprising:
    producing an associated first group of wavelength dependent signals at each position of the first subset of positions by using a wavelength decoding matrix associated with the first group of wavelengths and the intensity measurements of the first group of wavelengths; and
    combining all wavelength dependent signals of the measured groups of wavelengths after all the groups of wavelengths are measured at each position of the first subset of positions.

4. The method of claim 1, further comprising:
    retrieving a wavelength decoding matrix associated with the first group of wavelengths;
    producing an associated first group of wavelength dependent signals at each position of the subset of positions by using the wavelength decoding matrix and the intensity measurements of the first group of wavelengths;
    after producing an associated first group of wavelength dependent signals, determining whether all groups of wavelengths have been measured.

5. The method of claim 4, further comprising:
    after determining that all groups of wavelengths have not been measured, retrieving a second wavelength encoding matrix associated with a second group of wavelengths of the groups of wavelengths;
    measuring the intensity for each wavelength of the second group of wavelengths at each position of the second subset of positions.

6. The method of claim 5, further comprising:
    selecting a second subset of positions of the set of positions from the position encoding matrix;
    separating the set of wavelengths into groups of wavelengths;
    retrieving a third wavelength encoding matrix associated with a third group of wavelengths of the groups of wavelengths; and
    measuring an intensity for each group of wavelength at each position of the subset of positions.

7. The method of claim 6, wherein the first group of wavelengths and the third group of wavelengths are the same group of wavelengths.

8. The method of claim 4, further comprising:
    after determining that all groups of wavelengths have been measured producing an associated first group of wavelength dependent signals at each position of the first subset of positions by using a wavelength decoding matrix associated with the first group of wavelengths and the intensity measurements of the first group of wavelengths; and
    combining all wavelength dependent signals of the measured groups of wavelengths after all the groups of wavelengths are measured at each position of the first subset of positions.

9. The method of claim 1, wherein measuring the intensity for the first group of wavelengths at each position of the first subset of positions further comprises determining a set of signal values included in a signal intensity matrix.

10. The method of claim 1, wherein measuring the intensity for the first group of wavelengths at each position of the first subset of positions further comprises measuring a reference intensity.

11. The method of claim 10, wherein measuring intensity for the first group of wavelengths at each position of the first subset of positions and measuring the reference intensity occur simultaneously.

12. The method of claim 1, further comprising:
determining that all groups of wavelengths have been measured producing an associated first group of wavelength dependent signals at each position of the first subset of positions by using a wavelength decoding matrix associated with the first group of wavelengths and the intensity measurements of the first group of wavelengths;
combining all wavelength dependent signals of the measured groups of wavelengths after all the groups of wavelengths are measured at each position of the first subset of positions; and
determining whether all the positions in the position encoding matrix have been measured.

13. The method of claim 12, further comprising:
determining that all the positions in the position encoding matrix have been measured;
retrieving a decoding matrix associated with position; and
determining a set of wavelength and position dependent signals.

14. The method of claim 12, further comprising:
determining that all the positions in the position encoding matrix have not been measured;
selecting a third subset of positions of the set of positions from the position encoding matrix;
separating the set of wavelengths into groups of wavelengths;
retrieving a third wavelength encoding matrix associated with a third group of wavelengths of the groups of wavelengths; and
measuring an intensity for each wavelength of the third group of wavelengths at each position of the third subset of positions.

15. A method for taking a measurement of a sample at a set of positions using a measurement system, comprising:
selecting a plurality of position encoding states using a position encoding matrix, wherein each of the plurality of position encoding states is associated with a corresponding subset of a set of positions;
for each position encoding state, measuring the sample using the measurement system to obtain a set of wavelength-dependent signals; and
determining, using the sets of wavelength-dependent signals and an inverse of the position encoding matrix, a plurality of nested signals, each of which is associated with a corresponding wavelength and position.

16. The method of claim 15, wherein:
the method further comprises determining a first group of wavelengths associated with a wavelength encoding matrix;
measuring the sample using the measurement system to obtain the sets of wavelength-dependent signals comprises:
measuring each wavelength of a first group of wavelengths at each position of a corresponding first set of the set of positions; and
after measuring each wavelength of the first group of wavelengths, retrieving an inverse of the wavelength encoding matrix to create wavelength-dependent signals associated with a first set of positions.

17. The method of claim 16, further comprising:
determining a second group of wavelengths associated with the wavelength encoding matrix;
measuring each wavelength of the second group of wavelengths at each position of a corresponding first subset of the set of positions;
determining that all the groups of wavelengths have been measured; and
combining the wavelength-dependent signals from the first and second groups of wavelengths.

18. A system, comprising:
a processor that generates a position encoding matrix for selecting a first set of positions;
one or more first light emitters configured to emit light into a sample; and
a detector array configured to measure light returned from the sample at the first set of positions, wherein:
the one or more first light emitters emits a first set of wavelengths of light associated with a wavelength encoding matrix during a first set of measurements, wherein the measurements for the first set of wavelengths is associated with the first set of positions;
the one or more first light emitters emits a second set of wavelengths of light associated with the wavelength encoding matrix during a second set of measurements, wherein the measurements for the second set of wavelengths is associated with the first set of positions; and
the processor determines, using an inverse of the wavelength encoding matrix and the first and second sets of measurements, a plurality of wavelength-dependent signals, each of which is associated with the first set of positions.

19. The system for claim 18, wherein:
the processor uses an inverse of the position encoding matrix used to determine a set of wavelength and position dependent signals; and
the processor combines the wavelength and position dependent signals.

* * * * *